US006862027B2

(12) United States Patent
Andrews et al.

(10) Patent No.: US 6,862,027 B2
(45) Date of Patent: Mar. 1, 2005

(54) SYSTEM AND METHOD FOR PARALLEL EXECUTION OF DATA GENERATION TASKS

(75) Inventors: Jeffrey A. Andrews, Sunnyvale, CA (US); Nicholas R. Baker, Cupertino, CA (US); J. Andrew Goossen, Issaquah, WA (US); Michael Abrash, Kirkland, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 10/611,415

(22) Filed: Jun. 30, 2003

(65) Prior Publication Data
US 2004/0263519 A1 Dec. 30, 2004

(51) Int. Cl.[7] .............................................. G06F 15/80

(52) U.S. Cl. ....................... 345/505; 345/557; 345/419; 711/122; 382/233

(58) Field of Search ................................ 345/418, 419, 345/423, 427, 430, 501, 502, 505, 557, 558; 711/118, 122, 128; 382/232, 233

(56) References Cited

U.S. PATENT DOCUMENTS 5,842,004 A * 11/1998 Deering et al. ............. 345/419
2002/0057850 A1 * 5/2002 Sirohey et al. ............. 382/299

OTHER PUBLICATIONS

Dominic Mallinson, Inside Playstation 2: Architecture, Graphic Rendering and Programming, accessible at http://www.bringyou.to/games/PS2.htm, accessed on Feb. 2, 2004.

Game Console Buying Guide, accessible at http://www.viewz.com/shoppingguide/consoleprint.htm, accessed on Feb. 2, 2004.

* cited by examiner

Primary Examiner—Kee M. Tung
(74) Attorney, Agent, or Firm—Microsoft Corporation Lee & Hayes PLLC

(57) ABSTRACT

A CPU module includes a host element configured to perform a high-level host-related task, and one or more data-generating processing elements configured to perform a data-generating task associated with the high-level host-related task. Each data-generating processing element includes logic configured to receive input data, and logic configured to process the input data to produce output data. The amount of output data is greater than an amount of input data, and the ratio of the amount of input data to the amount of output data defines a decompression ratio. In one implementation, the high-level host-related task performed by the host element pertains to a high-level graphics processing task, and the data-generating task pertains to the generation of geometry data (such as triangle vertices) for use within the high-level graphics processing task. The CPU module can transfer the output data to a GPU module via at least one locked set of a cache memory. The GPU retrieves the output data from the locked set, and periodically forwards a tail pointer to a cacheable location within the data-generating elements that informs the data-generating elements of its progress in retrieving the output data.

57 Claims, 12 Drawing Sheets

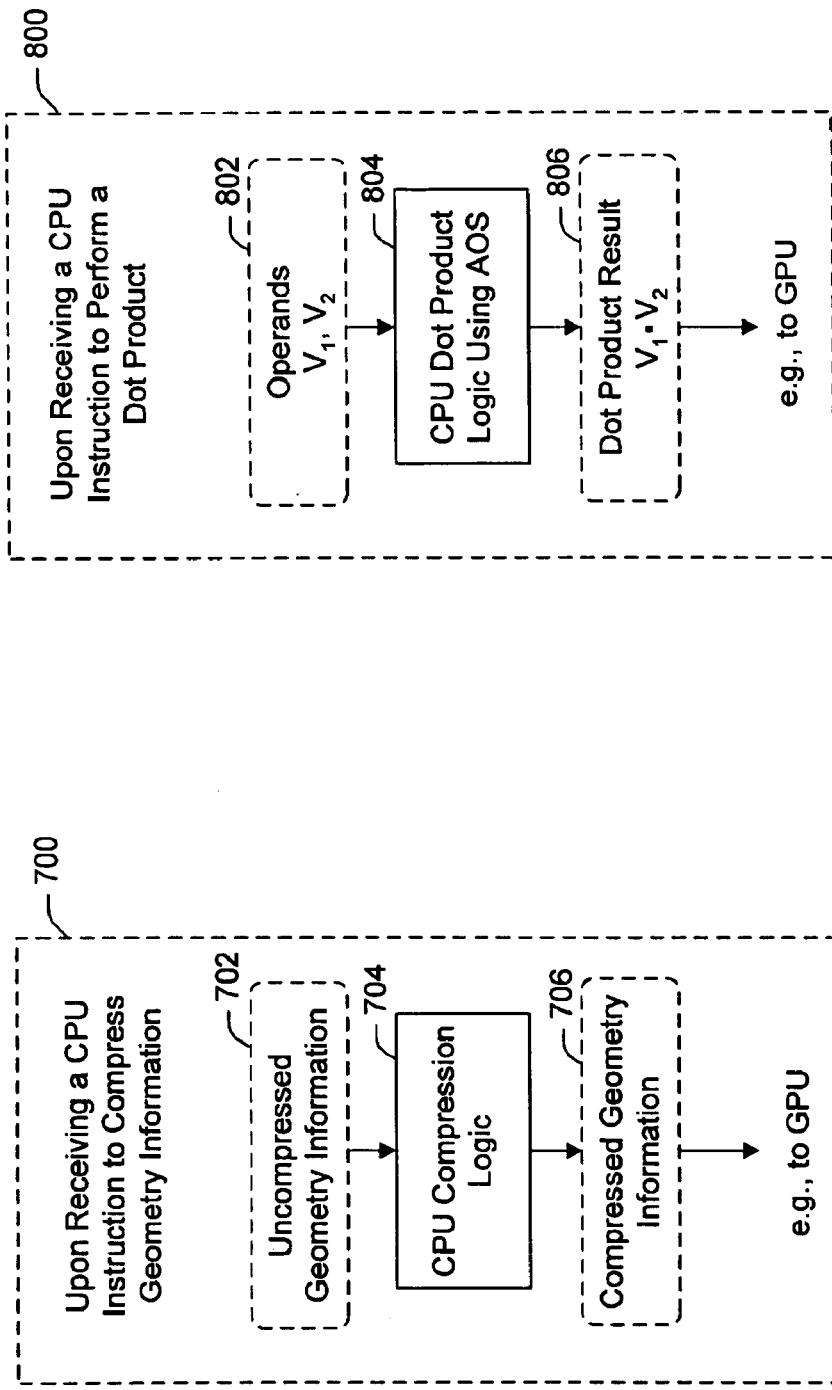

SYSTEM AND METHOD FOR PARALLEL EXECUTION OF DATA GENERATION TASKS

TECHNICAL FIELD

This invention relates to a system and method for the parallel execution of data generation tasks, and, in a more particular implementation, to a system and method for the parallel execution of geometry-related data generation tasks in a three dimensional graphics application.

BACKGROUND

Designers of computer graphics applications continually strive to provide more interesting rendered scenes to viewers. For instance, many game developers work toward increasing the realism of rendered scenes. A scene that provides a realistic depiction of characters and background scenery is more likely to capture the interest of a player, that is, by immersing the player in the game. The player's heightened interest, if shared by many players, may translate into increased profitability of the game.

A number of difficulties confront game developers when attempting to improve the realism of rendered scenes. Increasing the appeal of a scene usually equates to increasing the complexity of the scene. The increased complexity manifests itself in a marked increase in the amount of data associated with the scene. More specifically, graphics applications represent objects (e.g., models) within a scene using a mesh of polygons —typically triangles —which, in turn, comprise a number of vertices (loosely referred to as "geometry data" herein). Increasing the complexity of the scene typically equates to a marked increase in the amount of geometry data. For example, consider the case of a simple game which pits two characters against each other. Each character is represented by a model, which, in turn, comprises a set of geometry data. If a game developer desired to improve the realism of the game by increasing the amount of detail associated with the characters, or by adding more characters to the scene, then the amount of geometry data involved in rendering this scene could be expected to markedly increase. A scene that presented a whole army of such characters might be regarded as too complex to viably render in many game-playing platforms currently on the market.

More specifically, the above-described processing constraints arise from the demanding need to generate and process a large amount of game-related geometry data in the short amount of time necessary to render a scene in a typical game playing platform environment (e.g., a typical game renders a scene frame every 16 ms). This requires efficient algorithms for generating and processing the game-related data, as well as efficient strategies for moving this data from one module to another within the game console. More particularly, a typical bottleneck in graphics processing is the transfer of large amounts of data between the processing elements of the game console (e.g., the computer processing unit and/or the graphics processing unit) and the memory of the game console (e.g., the RAM memory of the game console).

Still additional drawbacks (to be specified in the following discussion) exist which may prevent game developers from improving the complexity, efficiency, and/or realism of rendered scenes.

Accordingly, there is an exemplary need in the art to provide more efficient systems and techniques for increasing the complexity of rendered scenes. There are analogous needs in the art to provide more efficient systems and techniques for processing large amounts of data in other data processing fields, such as audio and video processing.

SUMMARY

According to one exemplary implementation, a system is described having a system memory, computer processing module, data processing module, and a communication bus that interconnects the computer processing module and the data processing module. The computer processing module includes a host processing element configured to perform a task and a data-generating processing element configured to perform a subtask within the task. The data-generating processing element, in turn, includes: logic configured to receive input data; and logic configured to process the input data to produce output data, wherein an amount of output data is greater than an amount of input data, a ratio of the amount of input data to the amount of output data defining a decompression ratio. The output data generated by the data-generating processing element is not contained in the system memory prior to it being generated by the data-generating processing element. The data processing module also includes a cache memory coupled to the data-generating processing element for receiving the output data. A computer processing module interface is used to transfer the output data from the cache memory. The above-described "elements" can refer to threads implemented on one or more computer processing units.

The data processing module includes a data processing module interface that connects to the computer processing module interface via the communication bus for receiving the output data. The data processing module also includes a data processing engine for receiving and processing the output data from the cache memory. The data processing engine uses a tail pointer to indicate a location within the cache memory from which it has just retrieved output data.

In a write streaming mode of operation, the computer processing module is configured to allocate a portion of the cache memory for the purpose of receiving streaming write data from the data-generating processing element. Further, in this mode, the system is configured to forward the output data from the allocated portion of the cache memory to the data processing module rather than from the system memory. The data processing module is configured to forward the tail pointer to a cacheable address of the data-generating processing element. This tail pointer informs the data-generating processing element of the location within the cache memory from which the data processing module has just retrieved output data.

In a graphics processing environment, the use of the above system allows a graphics application to generate a great quantity of geometry data using an efficient parallel processing strategy. Generating this data in real time reduces the storage requirements of system memory (which otherwise would have to store such data in advance). Further, the generation of data (as opposed to retrieval of pre-stored data) reduces the deleterious bandwidth restrictions associated with frequent accesses to system memory. The use of an allocated portion of cache memory to buffer streaming write data, and the use of the tail write-back protocol also reduce undesirable interaction with the system memory. These improvements, in turn, enable the graphics processing application to potentially provide more complex graphics scenes in sufficient time for real-time rendering, e.g., in a gaming environment. These improvements may also reduce the cost of the apparatus used to implement the parallel processing strategy. Namely, these improvements can reduce the storage and bandwidth associated costs of system memory, system busses, distribution media, peripheral busses, network connections, and so on.

In one implementation, one or more data-generating elements can be specifically used to perform procedural geometry and/or higher order surface tessellation. Performing these algorithms in a CPU module (as opposed to, for instance, a GPU module) offers a number of benefits. For example, in one implementation, the CPU-implementation of higher order surface tessellation gives a graphics developer more flexibility in selecting/designing a higher order surface tessellation algorithm to meet the needs of a particular processing environment.

A related method is also described herein.

BRIEF DESCRIPTION OF THE DRAWINGS

FIG. 7 shows exemplary logic provided by the computer processing units, shown in FIG. 1, to compress geometry data for output to a geometry processing unit module.

FIG. 8 shows exemplary logic provided by the computer processing units, shown in FIG. 1, to perform a dot product operation.

Figure 1:
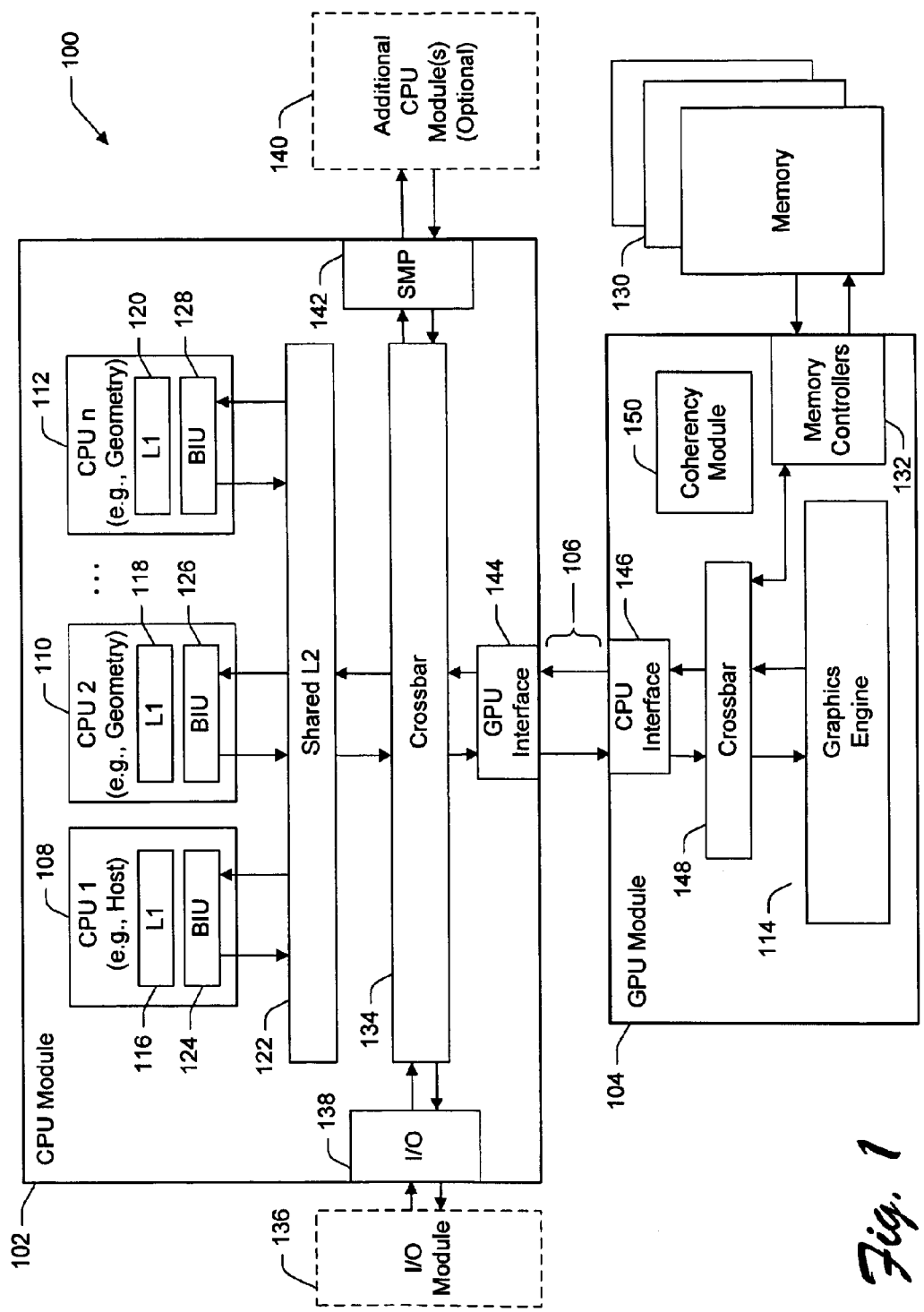
FIG. 1 shows an overview of an exemplary system including plural computer processing units.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to an architecture and related technique for parallel execution of data-generation tasks. Such data-generation tasks generally refer to an operation that entails receiving a first set of data and then generating a second set of data based on the first set of data, where the second set of data represents a greater amount of information than the first set of data. The ratio between the first set of data and the second set of data defines a decompression ratio. An application that provides a relatively high decompression ratio can effectively address some of the problems identified in the background discussion. For instance, an application that can generate a great amount of data from a relatively small set of input data eliminates (or reduces) the need to create this data beforehand, store such data in system memory, and then retrieve this data when it is time to process such data. Hence, such applications can avoid the deleterious latency and bandwidth problems associated with transferring data between system memory and the processing modules of an application. Further, such applications can also reduce the amount of information that needs to be stored in system memory, which is often a limiting resource, especially in game consoles. These improvements may also reduce the cost associated with various components of the game consoles.

A great number of applications of the above-described design strategy are envisioned, including applications involving graphical data, applications involving audio data, applications involving video data, etc. However, to facilitate explanation, the following discussion describes the application of the design strategy to the field of three dimensional computer graphics, and more specifically, to the field of three dimensional game-related computer graphics. Computer graphics applications represent data-intensive processing environments. Further, game-playing console environments require that a sizeable amount of data be processed in timely fashion (e.g., to render scenes at 16 ms per frame, etc.), and also require that this data be processed using an architecture that typically has relatively limited system memory resources. Hence, three-dimensional game applications represent an ideal application of the above design strategy. However, as noted above, the architectures and techniques described here are not to be construed as limited to such exemplary applications.

This disclosure contains the following principal sections. Section A describes an exemplary system for implementing the above-described design strategy. Section B describes an exemplary manner of operation of the system discussed in Section A. And Section C describes the application of systems and techniques described in Sections A and B to a game-playing environment.

A. Exemplary System Architecture

A.1. Overview of System

FIG. 1 shows an overview of a system 100 for providing more geometry data for use in a rendered scene. The system 100 can be implemented on any kind of platform, such as a personal computer (PC), gaming console (such as Microsoft's Xbox™ gaming-console produced by Microsoft Corporation of Redmond, Wash.), or any other kind of platform. Geometry data refers to information that is typically used in three dimensional graphics processing pipelines to render scenes. In a typical application, data is input into the three dimensional graphics processing pipeline that defines various objects (e.g., models) that will constitute rendered scenes, such as various characters, background objects, textures, etc. Such objects are represented as a mesh of interconnected polygons —most commonly —triangles. Each triangle, in turn, is composed of three vertices. The vertices contain information which identifies the positions associated with the vertices, as well as other information associated with the vertices (e.g., color, texture coordinates, normals, etc.). In one exemplary implementation, there are 64 bytes of information associated with a single vertex. (To facilitate explanation, the techniques and implementations are primarily described herein in the context of the processing/generating of geometry data, as defined above. However, it should be noted that the techniques and implementations can be used to process/generate any kind of data.)

In one exemplary implementation, the system 100 includes a computer processing unit module 102 (referred to below as a "CPU module" 102 for brevity) coupled to a graphics processing unit module 104 (referred to below as a "GPU module" 104 for brevity) via a front side bus 106. The CPU module 102 includes a collection of any number of computer processing units (CPUs), such as CPU 1 (108), CPU 2 (110), and CPU n (112) (where "n" generally indicates the last of the collection of CPUs). These CPUs (108, 110, . . . 112) provide general purpose computing units for processing data based on a series of program instructions specified by a graphics game developer. The GPU module 104 includes a graphics engine 114 that performs lower level 3D graphics processing tasks on received data.

The two major modules in FIG. 1, e.g., the CPU module 102 and the GPU module 104, will be described in further detail below.

Starting with the CPU module 102, the CPU module 102 allocates different roles to its CPUs (108, 110, . . . 112). For instance, CPU 1 (108) functions as a host processing 11 unit, whereas CPUs 2 to n (110, . . . 112) function as geometry processing units. The tasks associated with these roles differ for different applications. In a typical gaming application, the host CPU 1 (108) performs the high-level tasks associated with the game, such as receiving a player's input, performing scene management, performing the computations used to simulate the physical phenomena represented by the application, performing any artificial intelligence provided by the game, and so on. The CPUs 2 to n (110, . . . 112) perform more fine-grained processing associated with a game. In one application, these CPUs (110, . . . 112) generate geometry data associated with one or more objects in the scene. For instance, as will be described, each of these processors may include logic for performing procedural geometry. Such logic receives input data defining tasks to be performed, and then executes such tasks to provide output geometry data (e.g., a collection of vertices). To provide merely one example, a game designer could provide procedural logic to generate geometry data associated with individual leaves on a tree. Such procedural logic would receive a relatively limited amount of information associated with such a task, such as a location of an individual leaf, a direction of any simulated wind in the scene, and so on. Based on this information, the procedural logic could generate vertices that define an individual leaf on the tree. The CPUs that perform geometry-related tasks are referred to as geometry-generating CPUs.

In another application, the geometry-generating CPUs 2 to n (110, . . . 112) can perform tessellation of higher-order surfaces. A higher-order surface refers to the representation of an object in another parametric format other than a simple mesh of triangles. Most three dimensional processing engines, however, only process objects that are represented as simple polygons, such as triangles. The process of tessellation breaks these higher order surfaces into more primitive polygons, such as triangles. Thus, the geometry-generating CPUs 2 to n (110, . . . 112) can be used to execute such tessellation, that is, by receiving higher order surfaces and breaking these surfaces into more elementary forms. Exemplary higher order surfaces include B-spline surfaces, Bézier surfaces, n-patches, etc.

The geometry-generating CPUs 2 to n (110, . . . 112) can provide the above-described procedural geometry and/or higher order surface tessellation in conjunction with level-of-detail (LOD) processing. In LOD processing, the level of complexity (and hence geometry data) associated with an object in a scene is varied as a function of the distance between the viewer and any object (or any sub-object pieces) within the scene. The LOD processing can apply different decompression ratios to achieve different levels of complexity. This will have the effect of applying higher levels of decompression for objects that are "close" to the viewer, producing higher levels of detail.

The examples provided above pertain to the generation of geometry data (e.g., color, texture coordinates, normals, etc.). However, the CPUs 2 to n (100, . . . 112) can be used to procedurally generate other kinds of data, such as GPU commands.

As noted above, while n CPUs (108, 110, . . . 112) are illustrated in FIG. 1, any number of CPUs can be included (including, for instance, only two CPUs). Further, additional CPUs can be devoted to performing host-related functions (that is, more than one CPU can be allocated to performing host-related functions). In one implementation, all of the CPUs (108, 110, . . . 112) are structured in the same manner. That is, all of the CPUs operate using an identical instruction set, but perform different functions based on the programs provided by the game developer. For example, a designer may prefer to design the CPU module 102 such that all of its CPUs have the same structure to facilitate testing of the CPU module 102, and later programming of the CPU module 102 by a game developer. However, in another implementation, the host CPU(s) can be designed to have a different architecture and functionality than the geometry-generating CPUs.

In one application, the system 100 can be configured to statically assign roles to the CPUs (108, 110, . . . 112), e.g., by assigning a CPU to the role of either a host CPU or a geometry-generating CPU. In another application, the system 100 can allocate these roles in a dynamic fashion, possibly on a frame by frame basis, or even many times within a frame (e.g., on an intra-frame basis). Thus, in one application, all of the CPUs (108, 110, . . . 112) can be assigned the role of handling host-related tasks. This might be appropriate in those cases where a programmer does not wish to make use of the special features provided by the geometry-generating CPUs 2 and n (110, . . . 112). In another case, the system 100 can assign the role of geometry-related processing to all of the CPUs (108, 110, . . . 112) for some portion of the frame time. In another case, as will be discussed below, the system can include two or more CPU modules 102. In this case, the system 100 can allocate the same role to all of the CPUs in one of the CPU modules 102 (such as geometry processing). In this scenario, it may be considered beneficial to locate the CPU module 102 assigned the role of host processing closest to a system memory 130 (because, in some environments, the host may be more negatively impacted by random access read misses than the geometry processing functionality, and therefore has more of a need for lower latency compared to the geometry processing functionality).

Each CPU includes an internal L1 cache. For instance, CPU 1 (108) includes an internal L1 cache 116, CPU 2 (110)

includes an internal L1 cache 118, and CPU n (112) includes an internal L1 cache 120. A cache refers to a readily accessible storage space for storing data that is likely to be used by the CPU. Although not shown, in a conventional manner, the L1 caches (116, 118, 120) can include a portion allocated to storing instruction-related information, and a portion allocated to storing data. Further, although not shown, each of the CPUs (108, 110, . . . 112) will include a collection of 11 storage registers. Storage registers provide even more readily accessible storage locations than the L1 caches (116, 118, 120).

The CPUs (108, 110, . . . 112) are coupled to a shared L2 cache 122 through multiple ports via bus interface units 124, 126, and 128, respectively. As the name suggests, each of the CPUs (108, 110, . . . 112) share (e.g., use) the L2 cache 122. To complete the explanation of the memory hierarchy shown in FIG. 1, the system 100 includes the system memory 130, which can comprise one or more storage devices providing Random Access Memory (RAM) storage (in one example, having a storage capacity in the kilobyte or megabyte range, etc.). The GPU module 104 interacts with the system memory 130 via memory controllers 132.

The L2 cache 122, like the individual L1 caches (116, 118, 120), provides storage for information that is likely to be requested by the CPUs (108, 110, . . . 112) and the GPU module 104. That is, the caches (116, 118, 120, 122) allow the processing functionality in system 100 to access data without having to read from or write to the system memory 130. It is generally desirable to avoid reading from or writing to the system memory 130, as such operations will impose latency delays (e.g., in one exemplary implementation, delays of possibly greater than 100 cycles). However, if data cannot be obtained from one of the caches (116, 118, 120, 122), then the processing functionality in system 100 will access such data from the system memory 130. The shared L2 cache 122 can be implemented as an n-way set associative cache, as will be discussed further in connection with FIGS. 4 and 5 below. In terms of physical implementation, in one exemplary case, the L2 cache 122 can include a collection of RAM memories having a total memory capacity in the kilobyte or megabyte range, etc.

The CPU module 102 further includes a crossbar coupling mechanism 134 (referred to below as simply a crossbar 134 for brevity). The crossbar 134 comprises a switching mechanism that selectively connects any one of a plurality of input ports to any one of a plurality of output ports. There are different ways to implement the crossbar 134, such as by using a multiplexing mechanism.

The crossbar 134 provides connectively to a number of entities, such as I/O module 136 via I/O interface 138. The I/O module 136 generally represents any functionality for receiving input and/or providing output in connection with a specific application. In a game application, the I/O module 136 can receive a game player's input using various controllers via a Universal Serial Bus (USB) mechanism, etc. This I/O module 136 can also provide network connectivity, audio system coupling, etc.

The crossbar 134 also provides optional connectivity to other CPU processing modules 140 via a Symmetric Multiprocessing (SMP) interface 142. Symmetric multiprocessing refers to an arrangement in which multiple CPUs share the same memory space and operating system. The optional other CPU modules 140 provide additional processing power to the system 100 if such functionality is deemed desirable for a particular application.

The crossbar 134 also provides connectivity to the GPU module 104 via GPU interface 144 and CPU interface 146.

The front side bus 106 couples the GPU interface 144 and CPU interface 146. This bus 106 should have sufficient bandwidth to handle the large amount of data generated by geometry-generating CPUs 2 to n (110, . . . 112), as well as host bandwidth and coherency traffic. Another crossbar 148 in the GPU module 104 directs the geometry data received from the CPUs 2 to n (110, . . . 112) (as well as other data) to the graphics engine 114. The graphics engine 114 can perform a variety of graphics-related operations. Such operations can include various tasks associated with a conventional three dimensional graphics processing pipeline, including vertex processing (which generally involves geometrically transforming the vertex data and applying lighting, e.g., shading, to the vertex data), backface culling processing, clipping processing, triangle set-up processing, rasterization, pixel-based shader processing, fog processing, alpha testing, depth testing, stencil testing, alpha blending, dithering, etc. An exemplary overview of conventional graphics pipeline processing is presented in, for instance, Wolfgang F. Engel, *Direct3D: ShaderX: Vertex and Pixel Shader Tips and Tricks,* 2002, Wordware Publishing, Inc. In one exemplary implementation, the CPUs (108, 110, . . . 112) differ from the functionality provided by the GPU module 104 in a number of respects; for instance, the CPUs (108, 110, . . . 112) typically have a much more general software programming model, perform significantly better on single threaded applications, and enable more decision-based branching than the GPU module 104. In other implementations, the distinction between the functionality provided by the CPUs (108, 110, . . . 112) and the functionality provided by the GPU module 104 may be less pronounced.

As will be discussed in Section B below, in one exemplary implementation, the GPU module 104 interacts with memory using a Direct Memory Access (DMA) protocol. For instance, the system 100 performs a command list fetch using a DMA mechanism. The DMA mechanism does not "know" where the data is being obtained from; it is the function of the crossbars to fetch data from the correct location. In one implementation, to fetch data over the front side bus 106, the system 100 forms a particular packet to initiate a "read" from the CPU module 102.

A coherency module 150 optionally ensures that CPU cache resident data remains coherent with main memory. The coherency module 150 also provides functionality that is specifically tailored to the data streaming provided by the system 100, where such functionality differs in one or more respects from traditional cache coherency. Additional details regarding the operation of the coherency module 150 will be presented 11 in Section B below.

In one exemplary implementation, the CPU module 102 is implemented as a first chip in a game-playing console, and the GPU module 104 is implemented as a second chip in the game-laying console. Additional CPU module chips can be included, along with associated GPU module chips. In other implementations, the functionality described in FIG. 1 can be grouped together in different ways than is shown in FIG. 1.

A.2. Multi-Threading

Figure 2:
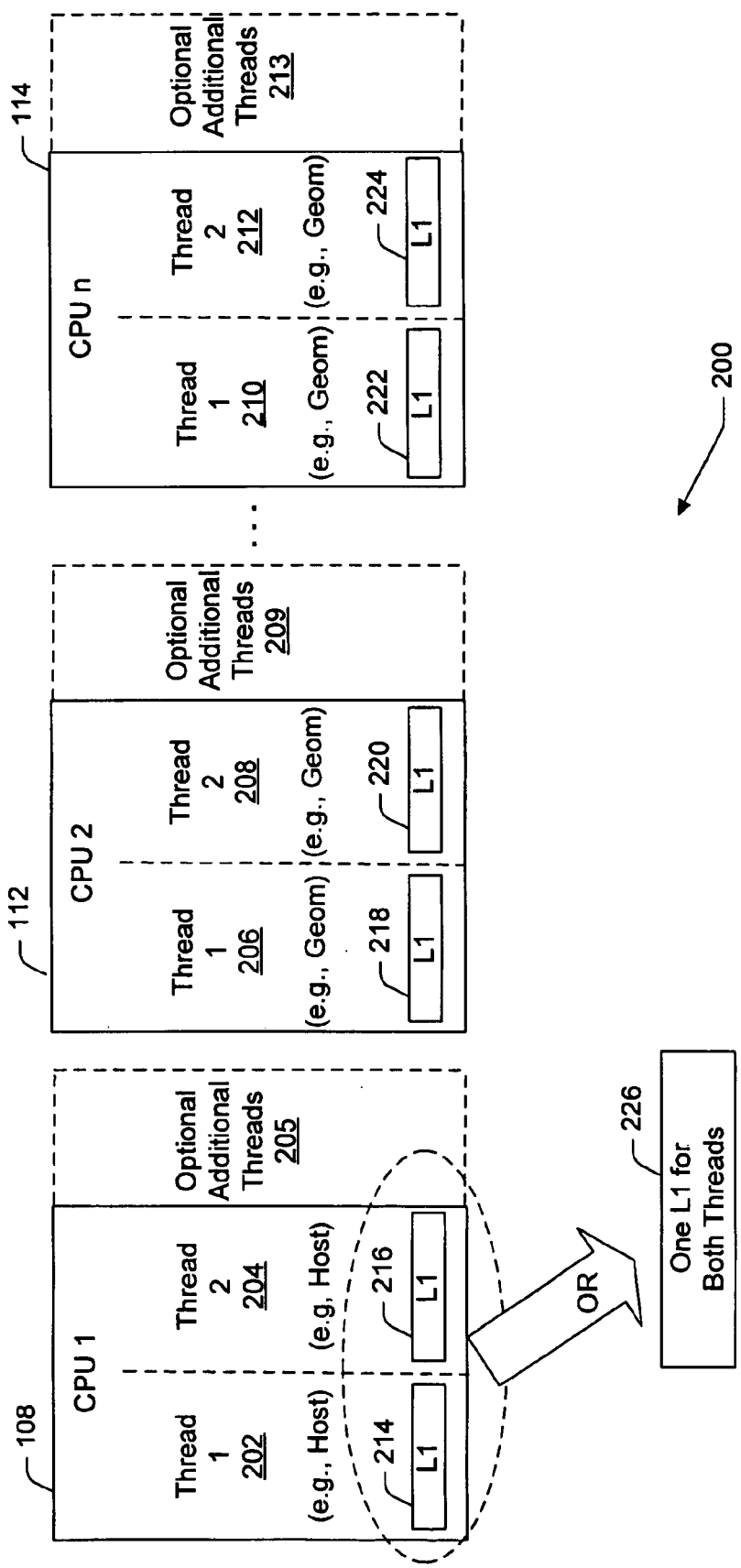
FIG. 2 shows an exemplary use of multi-threading in the computer processing units shown in FIG. 1.

In FIG. 1, the respective entireties of CPUs 108, 110, 112 are devoted to either a single thread of host-related processing or a single thread of geometry-generating processing. However, FIG. 2 shows an arrangement 200 which allocates the processing resources in the CPUs (108, 110, . . . 112) to multiple threads (e.g., two or more threads). That is, CPU 1 (108) includes multiple threads (202, 204, . . . 205) devoted to host-related processing. CPU 2 (110) includes multiple threads (206, 208, . . . 209) devoted to geometry-related processing. CPU n (112) includes multiple threads (210, 212, . . . 213) devoted to geometry-related processing. In another implementation, the roles associated with a single CPU can be split between host-related processing and geometry-related processing (or some other kind of processing). For instance, the thread 202 in CPU 1 (108) can be devoted to host-related processing, and the thread 204 can be denoted to geometry-related processing. In one implementation, the multi-threading can be implemented using fine-grained hardware threading technology.

In general, as is well known in the art, a thread refers to a task performed by a processing unit, typically comprising a series of subtasks performed in a specific order forming a sequence of such subtasks. An exemplary processing unit that accommodates two threads allocates resources between two such tasks. For instance, in one example, a processing unit can execute a first task (thread) comprising a plurality of subtasks. If, in the course of executing these subtasks, a data hazard is encountered, then there will be a delay in processing the subtasks. For example, if data cannot be obtained from an immediately accessible cache location, then the system must retrieve the data from a less readily accessible source, such as the system memory 130. This operation can introduce a delay in the performance of the first thread of potentially several hundred cycles. Such a delay represents a "bubble" in the execution of the first thread. So that the processing unit will not be idle during this bubble, the processing unit is configured to use the idle resources of the processing unit to perform subtasks in the second thread. In this manner, the processing unit makes more efficient use of its resources and also potentially expedites the rendering of scenes.

In the arrangement 200 shown in FIG. 2, each thread includes its own L1 cache (or its own portion of an L1 cache). For instance, the arrangement 200 includes L1 caches 214, 216, 218, 220, 222, and 224 for the exemplary case where each CPU includes two threads. In another implementation, each thread of a CPU will utilize a common L1 cache. This arrangement is illustrated in FIG. 2 by the exemplary provision of a single L1 cache 226 for threads, 202, 204, etc.

Although not illustrated, the GPU module 104 can also perform its allotted functions using one or more threads.

Further, the ensuing discussion (e.g., with reference to FIG. 5) presents examples that use multiple CPUs, each of which may include multiple threads. However, in another implementation, the CPU module can employ only one CPU having multiple threads. In this single CPU scenario, one or more of the threads can be provided to perform the role of host, and one or more threads can be provided to perform the role of generating geometry data. The generic term "processing element" has broad connation as used herein; for instance, it can refer to a thread implemented on a single-threaded CPU or on a multi-threaded CPU, or some other kind of processing functionality.

A.3. Bandwidth Considerations

Figure 3:
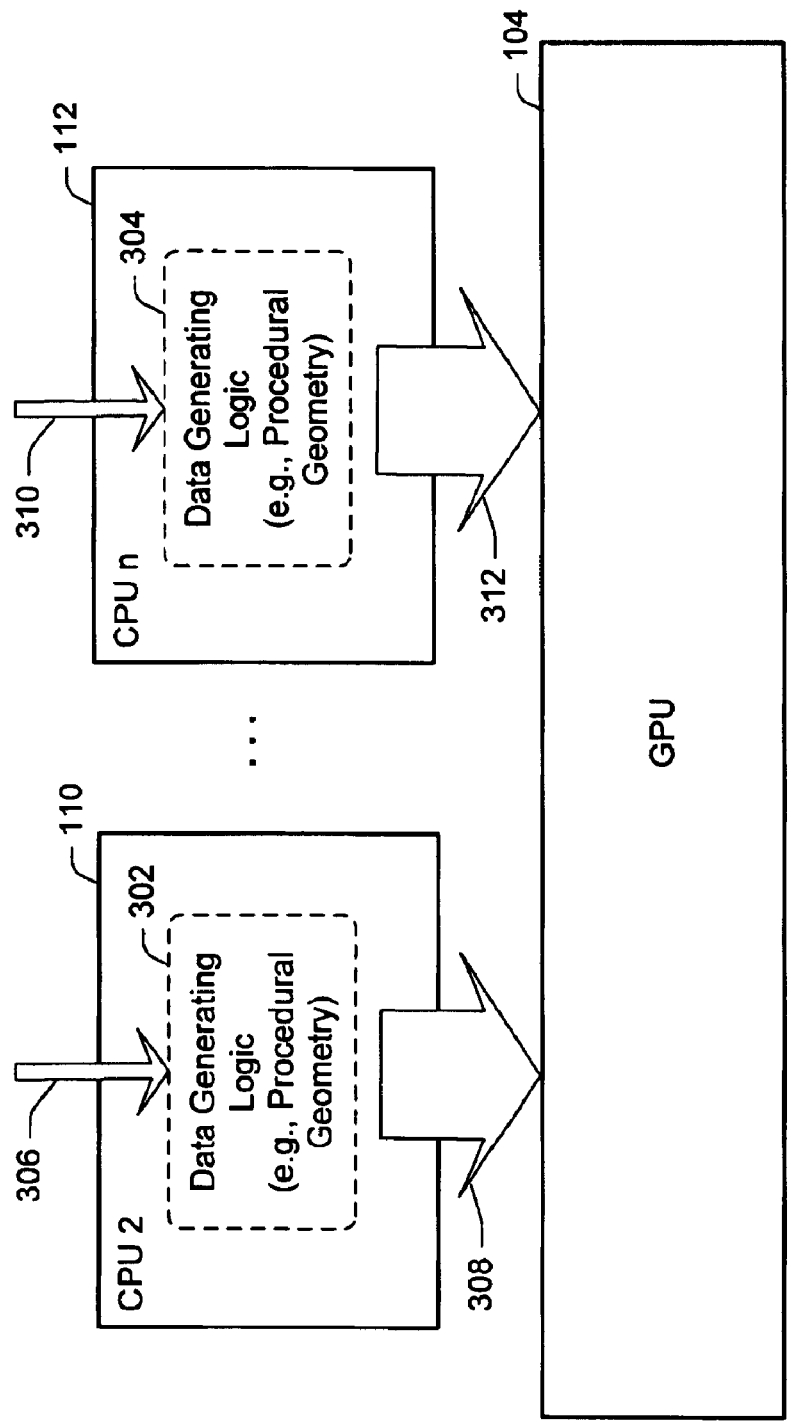
FIG. 3 illustrates the effects of procedural geometry in the computer processing units of FIG. 1 to achieve a beneficial decompression ratio.

FIG. 3 graphically illustrates the generation of geometry data using the CPUs 2 to n (110, . . . 112) devoted to geometry-related tasks, as well as the consequent decompression ratios which measure how much geometry data these units (110, 112) provide relative to the amount of data fed to these units. More specifically, CPU 2 (10) includes data generating logic 302, such as procedural geometry logic or higher order surface tessellation logic (in conjunction with level-of-detail processing). In similar fashion, CPU n (112) includes data generating logic 304, such as procedural geometry logic or higher order surface tessellation logic (in conjunction with level-of-detail processing). The input data supplied to logic 302 is represented by the relatively thin arrow 306, and the output data generated by logic 302 is represented by the relatively wide arrow 308. This illustrates the concept emphasized above —namely, that the logic 302 receives a relatively small amount of data and generates a relatively large amount of geometry data in response thereto. The ratio of the input data (represented by thin arrow 306) and output data (represented by fat arrow 308) is referred to as the decompression ratio of the logic 302. Such decompression ratio can be at least 1 to 10 in one application, at least 1 to 100 in another application, and at least 1 to 1000 or more in still another application, etc. For example, for the case in which a decompression ratio of at least 1 to 100 is provided, this means that the ratio of a quantity of input data to a quantity of output data is at least $\frac{1}{100}$. CPU n (112) receives input data represented by arrow 310 and provides output data represented by arrow 312. The discussion provided for CPU 2 (110) applies to the functionality of the CPU n (112) as well. The output data provided by CPU 2 (110) to CPU n (112) are fed to GPU processing module 104 for further processing, e.g., in a conventional three dimensional graphics processing pipeline. (While the above discussion is framed in the context of relatively large decompression ratios to highlight the exemplary merits of the system 100, smaller decompression ratio are possible too —for instance, decompression ratios less that 1 to 10.)

The buses provided in FIG. 1 can be tailored to accommodate the asymmetry between the reading bandwidth and the writing bandwidth discussed above. In one exemplary implementation, this can be implemented by making the write bandwidth about twice or three times as large as the read bandwidth. In one case, the system 100 can realize a decompression ratio of 1 to 100, or even 1 to 1000 or more. However, these relatively high decompression ratios may only reflect the operation of the system 100 during streaming write operations involving procedural geometry generation, or other high bandwidth write operations (which may or may not involve decompression of data). Hence, a more modest ratio between the reading and writing bandwidths (e.g., a ratio of about 1 to 2, or 1 to 3, etc.) can be provided to accommodate other processing modes where there is not such a large disparity between the respective reading and writing bandwidths (however, depending on the processing environment and other considerations, other implementations can provide larger writing bandwidths relative to reading bandwidths).

In one entirely exemplary implementation, the CPUs can produce an aggregate stream of geometry data of thousands or millions of vertices per second, or some other quantity per second depending on the requirements of a particular data processing environment. In one exemplary implementation, using uncompressed data of several bytes per vertex (e.g., 32, 64, 128, etc.), this amounts to a bandwidth in the MB/s range or the GB/s range from the CPU module 102 to the GPU module 104, although smaller or larger rates can be provided too.

The above-described high levels of decompression have a number of benefits. In the context of a game console, for example, the high levels of decompression can improve the performance of the console (e.g., by reducing latency) and reduce the system memory requirements (and associated cost) of the console. Providing high levels of decompression in the CPU module 102 can also reduce the complexity and associated cost of other components in the game console, such as system busses, distribution media (e.g., DVD), peripheral busses, network connections, and so on. For instance, the decompression applied in the CPU module 102 can reduce the complexity and associated cost of compression/decompression schemes conventionally used in other components in the game console, or even, in some cases, eliminate such traditional compression schemes.

A.4. L2 Cache

Figure 4:
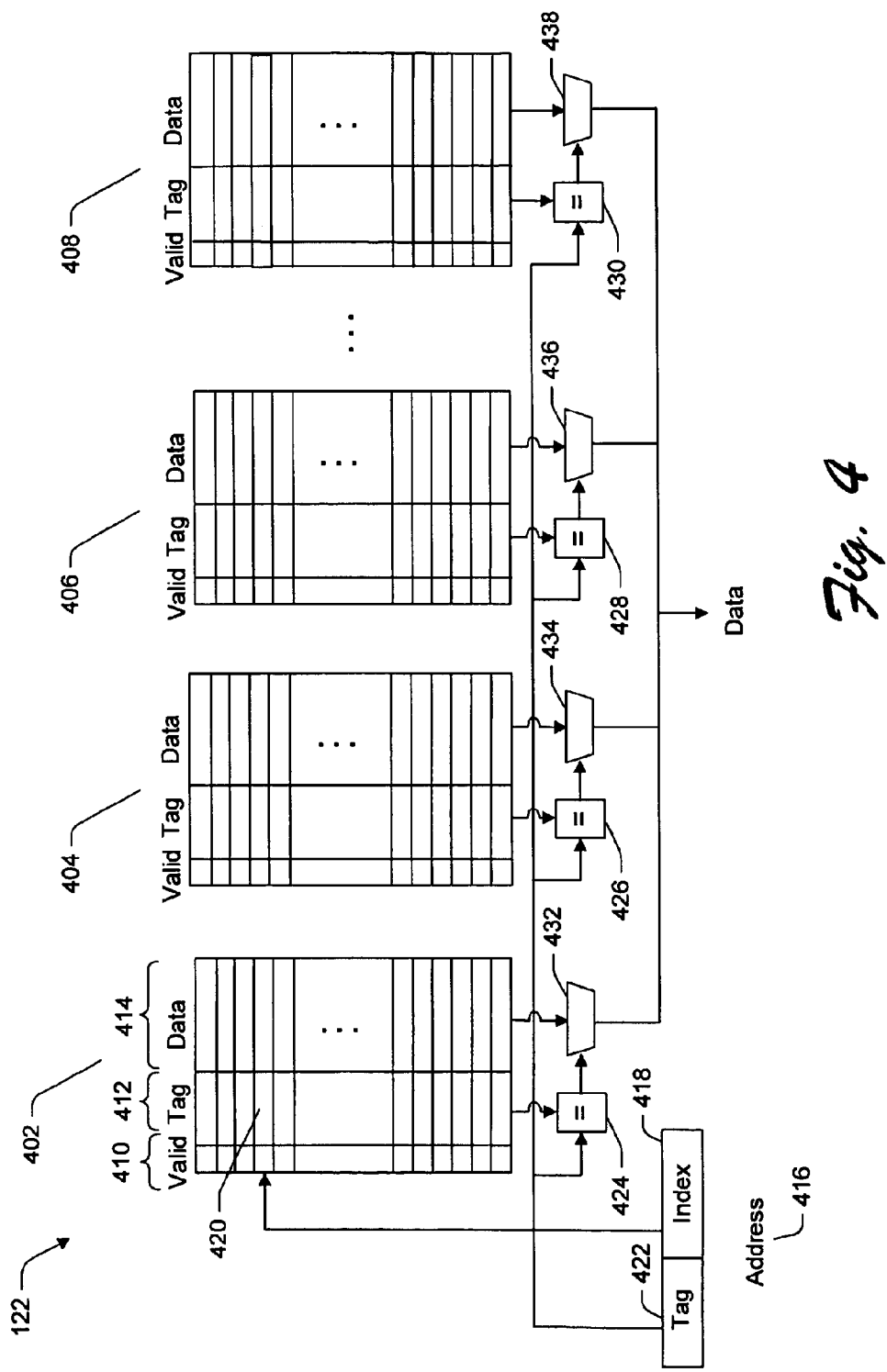
FIG. 4 shows an exemplary structure of an n-way set associative L2 cache used in the system of FIG. 1.
Figure 5:
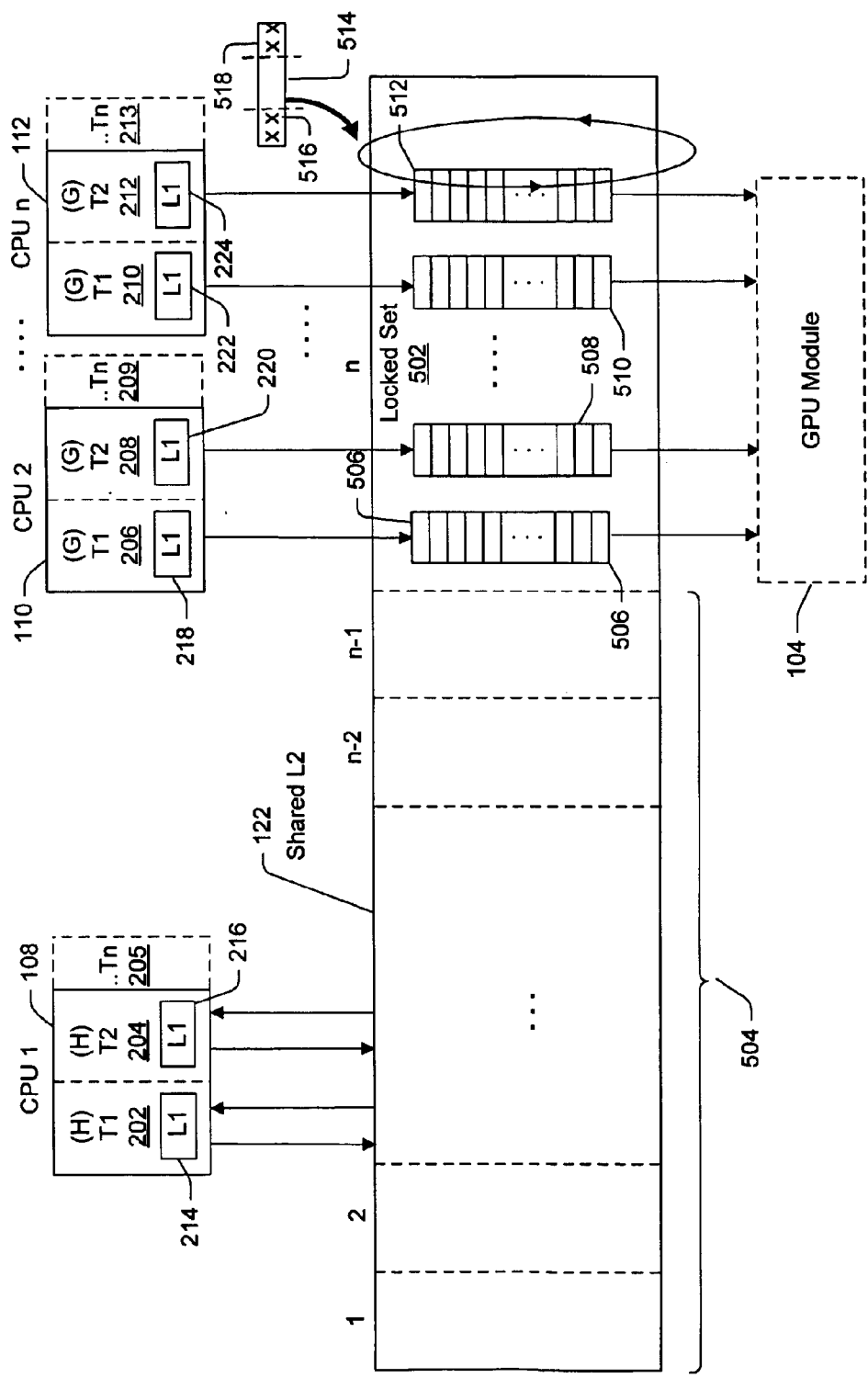
FIG. 5 shows an exemplary configuration of the L2 cache shown in FIG. 4 for a streaming write mode of operation, in which one set of the n-way set associative cache is locked.

FIGS. 4 and 5 provide additional detail regarding the structure and operation of the L2 cache 122 shown in FIG. 1. Starting with FIG. 4, in one exemplary embodiment, the L2 cache 122 is implemented as an n-way set associative cache, where n can be 16 or less in one exemplary implementation (however, other implementations can employ a set associative cache having more than 16 sets). More specifically, the L2 cache 122 includes a plurality of sets (402, 404, 406, . . . 408). Each set includes a plurality of cache lines having different fields associated therewith. A first field 410 provides a validity bit which indicates whether the information provided in a particular line is valid or invalid. A second field 412 provides tag information used for address matching purposes. A third field 414 provides data. A conventional group of logic elements matches an address 416 with an entry in the L2 cache 122 (if it exists), and outputs data stored at that location. That is, an index portion 418 in the address 416 is used to identify a specific cache line 420 within the L2 cache 122. A tag portion 422 of the address 416 allows the system 100 to identify a specific piece of data within the L2 cache 122 by comparing tag information stored in field 412 in the L2 cache 122 with the tag portion 422 within the cache line identified by the index portion 418. Comparison elements 424, 426, 428, and 430 perform such tag comparison function. Elements 432, 434, 436, and 438 forward data stored in a matching location within the L2 cache 122.

FIG. 5 illustrates how the sets shown in FIG. 4 can be allocated to different processing threads (202–213). These processing threads (202–213) and their constituent features were discussed with reference to FIG. 2, and therefore will not be described again here, other than to point out that each CPU (108, 110, . . . 112) can employ two or more threads; however, to facilitate discussion, the functionality provided by only two of each CPU's threads will be described below. As noted, in one exemplary implementation, the L2 cache 122 is implemented as an n-way set associative cache (such as, in one exemplary case, 16 or less). Accordingly, FIG. 5 shows n sets labeled sets 1 to n.

By way of introduction, the system 100 shown in FIG. 1 can operate in a write data streaming mode in which the CPUs allocated to geometry-generating tasks generate a large amount of geometry data. The CPU module 102 forwards this large amount of geometry data from the CPU module 102 to the GPU module 104 via the front side bus 106. The L2 cache 122 facilitates this mode of operation by buffering the geometry data prior to its transfer to GPU module 104. More specifically, in a write streaming mode of operation, the system 100 locks one set of the L2 cache 122 and uses this locked set to facilitate the transfer of geometry data to the GPU module 104. FIG. 5 shows such a locked set 502, leaving remaining sets of the L2 cache unlocked (referred to as unlocked sets 504). The system 100 allocates threads 202 and 204, which are associated with the host-related role to the unlocked sets 504, and allocates the threads 206–212 to the locked set 502 for the purpose of performing write streaming. In other words, threads 202 and 204 do not play a direct role in the generation of write streaming data, and therefore are not associated with the locked set 502. Threads 206–212 can also access the unlocked set 504 for various purposes other than write streaming. For example, in one exemplary application, the threads 206–212 can be allowed to access data in unlocked set 504 providing that such data has a low bandwidth associated therewith and is likely to be reread by multiple threads. As will be explained below, allowing the threads 206–212 to access the unlocked set 504 for high-bandwidth operations has the potential negative is effect of degrading the performance of the host threads 202 and 204, and is therefore proscribed.

Different strategies can be used to provide the locked set 502. For instance, cache lines are typically cast out of a cache based on various factors, such as a determination of how recently the cache line was accessed (for either a read or write operation). Thus, the set 502 can be locked by configuring cache management logic (not shown) to indicate that the entries within the locked set 502 are always the most recently accessed entries within the L2 cache 122. This would prevent these entries from being retired (e.g., "cast out"). Still additional strategies exist for accomplishing the same locking functionality.

Multiple First-In-First-Out (FIFO) buffers 506, 508, 510, and 512 are formed within the locked set 502. In this exemplary case, four buffers are illustrated; although a fewer or greater number of buffers can be provided. These buffers (506, 508, 510, 512) each include a plurality of storage elements for receiving data from respective geometry-generating processing threads (206, 208, 210, 212), and for storing such data until the data can be retrieved by the GPU module 104. That is, such buffers (506, 508, 510, 512) accommodate the fact that the writing speed of the threads (206, 208, 210, 212) is generally not in sync with the reading speed of the GPU module 104, and thus there needs to be a mechanism for temporarily storing the output of the processing threads (206, 208, 210, 212) until it can be accessed. More specifically, each FIFO (506, 508, 510, and 512) includes a tail pointer associated therewith (not shown). The tail pointer notifies the thread associated with a FIFO of how far the GPU module 104 has progressed in reading data from the FIFO. This information allows the thread to determine how many storage elements in the FIFO have been freed up to receive new geometry data. In terms of physical implementation, in one exemplary case, the locked 18 set 502 can provide a storage capacity in the kilobyte range, with each of the FIFOs providing some fraction of that capacity; however, in other implementations, smaller or larger FIFO storage capacities can be provided.

Each FIFO has a discrete starting location and ending location. Thus, a CPU associated with a FIFO must periodically monitor the storage locations in the FIFO to ensure that the CPU does not attempt to store data past the end of the FIFO. When a CPU stores to the last storage location in its respective FIFO, the CPU should wrap around to store the next data at a first storage location in its FIFO. In this manner, the CPU uses the FIFO as a circular buffer. However, one disadvantage of this technique is that the CPU must periodically monitor its progress through the FIFO to ensure that it does not overshoot the end of the FIFO. Performing this checking can increase the complexity of the streaming write operation, and also can potentially introduce delays in the streaming write operation. One technique for addressing this problem is to wrap within the FIFO using a middle portion of an address. For instance, consider FIFO 512 associated with thread 212. Wrapping is performed in the FIFO 512 by ignoring the top and bottom bits of an address 514. The top and bottom bits of the address 514 are denoted by "don't care" bit fields 516 and 518, respectively (denoted in the FIG. 5 with x's).

Providing the locked set 502 in the L2 cache 122 is desirable to prevent the high write bandwidth associated with the output of geometry-generating threads (206, 208, 210, 212) from "thrashing" the L2 cache 122. Namely, the host-related threads (202, 204) require the use of the L2 cache 122 for conventional cache-related purposes, namely to store data that is most likely to be accessed by these threads (202, 204). However, in view of the replacement strategies used by cache memories, without locking a set in the L2 cache 122, the high volume of data writes generated by the geometry-generating threads (206, 208, 210, 212) will effectively cast the host's data out of the cache 122 (because the data provided by the geometry-generating threads will quickly assume the position of the most-recently used data). If this happens, the host-related processing threads (202, 204) will be required to access their required data from a remote memory, such as the system memory 130, which will incur a processing delay. This deleterious phenomenon constitutes the above-mentioned "thrashing." To prevent this from happening, the system 100 separates the demands of the host-related processing threads (202, 204) from the geometry-generating processing threads (206, 208, 210, 212). This locking provision prevents the above-described thrashing. In addition, without using a locked set, some of the data provided by the geometry generating threads can itself also be cast out of the cache, making the round trip to system memory before the GPU can use it. Given the huge amounts of data generated, this would induce unacceptable bandwidth demands. It would also introduce latencies that would reduce overall performance by making the GPU module 104 wait.

As mentioned above, the system 100 shown in FIG. 1 can dynamically assign roles associated with CPUs 108, 110, 112. As such, the configuration of the L2 cache 122 can likewise change in dynamic fashion. For instance, where a game developer does not wish to make use of the special functionality provided by geometry-generating CPUs 2 to n (110, 112), then the system 100 can allocate the entire cache 122 to host-related functions. Alternatively, the system 100 can allocate more than one set of the L2 cache 122 to geometry-related threads involved in the streaming write operation.

Figure 6:
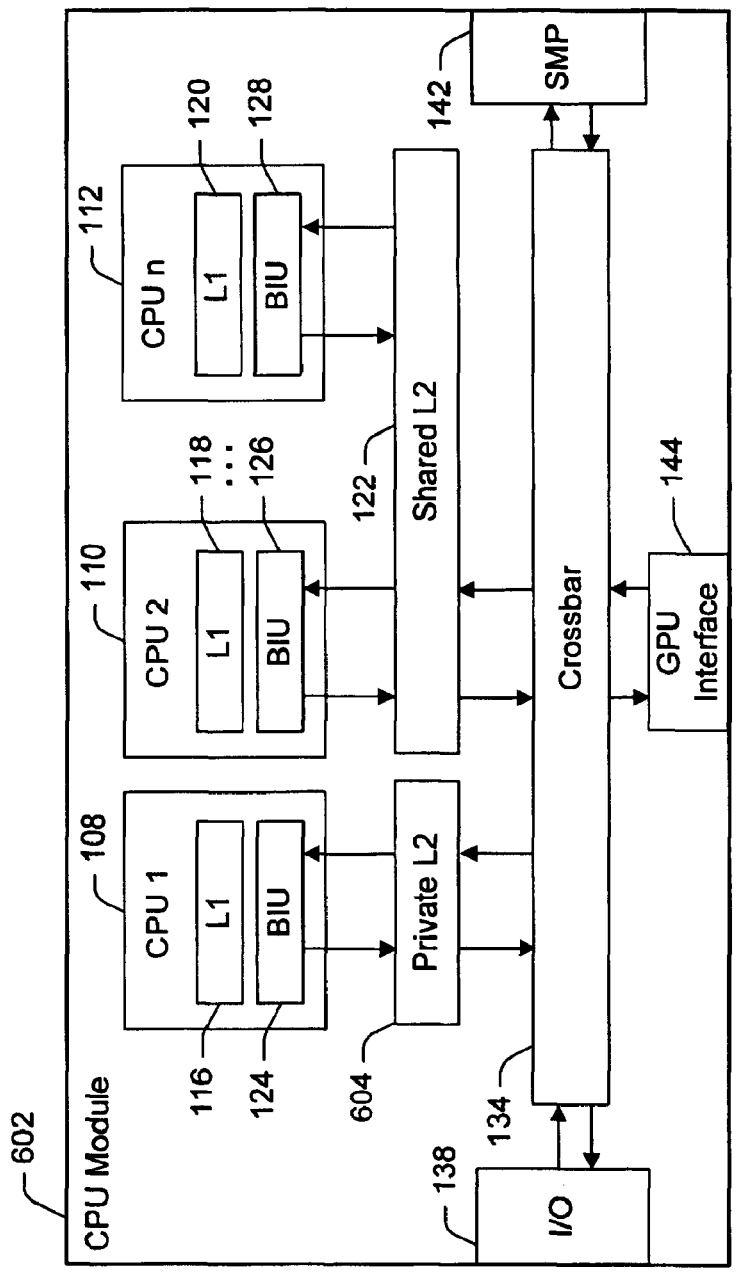
FIG. 6 shows an exemplary alternative implementation of a computer processing unit module shown in FIG. 1.

FIG. 6 shows another implementation of a CPU processing module 602. The CPU processing module 602 shown in FIG. 6 differs from the CPU processing module 502 shown in FIG. 1 in that the host-related CPU 1108 is provided with its own private L2 cache 604, rather than having to share the L2 cache 122 with the geometry-generating CPUs (110, . . . 112). That is, in the FIG. 6 implementation, the shared L2 122 is coupled to only CPUs 2 to n (110, . . . 112). This arrangement shown in FIG. 6 does not require that the system 100 lock a set in the L2 cache 122, since the host-related CPU 108 has its own L2 cache 604, and thus there is no chance of the other CPUs (110, 112) thrashing this private L2 cache 604.

A.5. Instruction Set Modifications

FIGS. 7 and 8 pertain to improvements made to logic used in the CPUs (108, 110, . . . 112). Namely, a CPU is typically designed so that it can be programmed using a defined set of stock programming instructions. These programming instructions pertain to an assortment of load and store operations, arithmetic operations, branching operations, etc. FIGS. 7 and 8 describe two enhancements to the instruction sets commonly found in CPU architectures used in graphics applications.

To begin with, FIG. 7 shows logic 700 used to compress geometry data prior to its output from the CPUs (108, 110, . . . 112). As stated, as the term is used in this disclosure, geometry data refers mainly to vertex information associated with the triangles that will constitute the surfaces to be rendered in the scene. The logic 700 involves receiving uncompressed geometry data (as indicated in processing block 702), compressing this geometry data (as indicated in processing block 704), and outputting compressed geometry data (as indicated in processing block 706). One or more instructions in the CPU's instruction set can initiate the series of actions shown in logic 700.

In one implementation, the logic 700 involves receiving the uncompressed geometry data in a first CPU register, performing compression on the geometry data as specified by an instruction in a program, and then loading the compressed geometry data into another CPU register. In another implementation, the compression operation can be combined within whatever functionality provides for outputting information from the CPU.

As to the compression itself, various known strategies can be used to compress the geometry data, such as the compression technique employed by Microsoft® DirectX® 9.(n), provided by Microsoft Corporation of Redmond, Wash. More specifically, different types of information associated with a vertex can be compressed using different techniques. Further, different types of information associated with a vertex can receive different degrees of compression. For instance, a first type of information can receive 2 to 1 compression, while another type of compression can receive 4 to 1 compression ratio, etc. In this sense, the compression provided by logic 700 is referred to as variable compression (meaning that it varies for different types of information within a vertex). Further, compression can vary for the same type of information depending on an application's needs. For example, geometric coordinates may be compressed to 8-bit values for some meshes, but can be 16-bit or 32-bit values for other meshes where fineness of placement is deemed to be important.

Compressing the geometry data that is output from the CPUs (108, 110, . . . 112) helps reduce the bandwidth of geometry data traveling between the CPU module 102 and the GPU module 104. Further, compressing the geometry data also enables the FIFOs in the locked set 502 of the L2 cache 122 to store more geometry data.

In another implementation, the instruction set also includes logic for decompressing information that is received by a CPU. This decompression can again be considered variable in that different pieces of data are subject to different techniques for decompression and possibly different degrees of decompression. The decompression can be implemented as a register to register operation, or can be integrated into whatever functionality the CPU uses to input data. In the latter technique, the decompression can be integrated as part of the normal load cycle of the CPU. The decompression functionality has several advantages. First, it makes the compression/decompression functionality symmetric such that a CPU can read and write compressed data stored at various levels of the memory hierarchy (e.g., main memory, read-only content media, or L1/L2 caches). Various game functions often produce data that is used significantly later (e.g., long enough such that the data has a very low likelihood of remaining in the CPU's caches). For these cases, the compressed data produced by the CPU for later use by another game function in the CPU will require much less main memory footprint, less write bandwidth to memory and less read bandwidth from memory. All these footprint and bandwidth improvements lead to the ability to store more data and/or achieve better game function performance by providing greater quantities of data in an efficient manner.

FIG. 8 provides other logic 800 for providing a dot product operation in an intuitive and user friendly manner. A conventional dot product of two graphics-related vectors, $V_1$ ($X_1$, $Y_1$, $Z_1$, $W_1$) and $V_2$ ($X_2$, $Y_2$, $Z_2$, $W_2$), is formed as follows: Dot product=$V_1 \cdot V_2 = X_1 X_2 + Y_1 Y_2 + Z_1 Z_2 + W_1 W_2$.

More specifically, to achieve best performance, many current CPU instruction a sets require a user to perform a dot product using the Structure of Arrays (SOA) approach, as opposed to the more intuitive and user friendly Array of Structure (AOS) approach. In the former approach, the operand data used to perform the dot product is loaded into appropriate registers provided by the CPU. Then, this operand data is manipulated by "rotating" it in such a manner to accommodate the SOA approach used by the CPU. Namely, to perform a multiplication of one vector by another, this SOA technique effectively turns a 1×4 vector on its side to provide a 4×1 vector. This results in an inefficient use of register capacity, as only one lane of each register is now used to store vector data Further, the operation of rotating a vector on its side (accomplished in a so-called "swizzling" operation) requires execution cycles that are "empty" in the sense of not performing any meaningful conversion of the vector data (that is, not performing any mathematical operations on the data). Allowing programmers to keep their data in AOS format greatly simplifies optimization efforts; by contrast, SOA is at odds with natural data structure design, and Application Program Interface (API) parameter passing. Further, SOA generally complicates the programmer's use of SIMD vector math instruction usage. The logic 800 overcomes these drawbacks by using the aforesaid AOS approach. (However, the CPUs employed in the present system 100 can be configured to perform the dot product using the SOA approach too; the user is thus afforded the option of performing the dot product using either the AOS approach or the SOA approach.)

More specially, the logic 800 includes receiving operands that will be used to perform the dot product (as indicated in operation block 802), performing the dot product using the AOS approach (as indicated in operation block 804), and then outputting the dot product result (as indicated in operation block 806).

B. Exemplary Method of Operation

Figure 9:
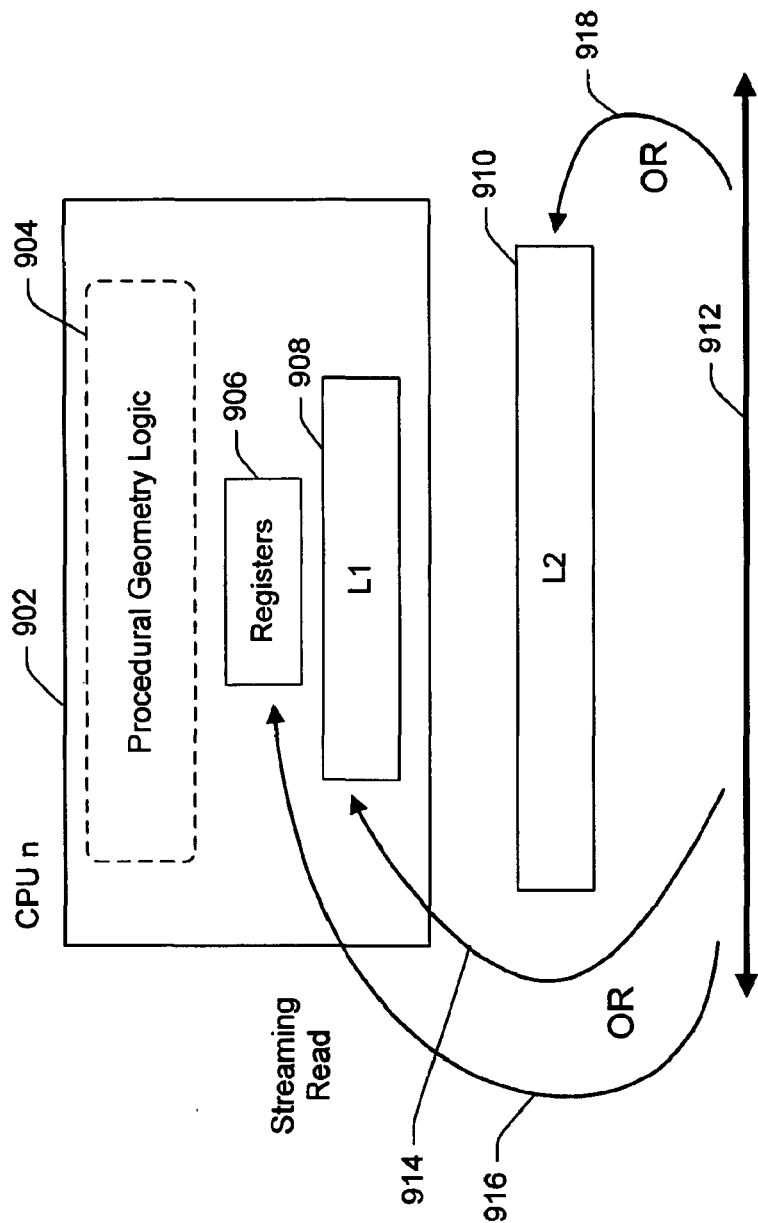
FIG. 9 illustrates an exemplary technique for reading information into a computer processing unit in a streaming mode of operation.
Figure 10:
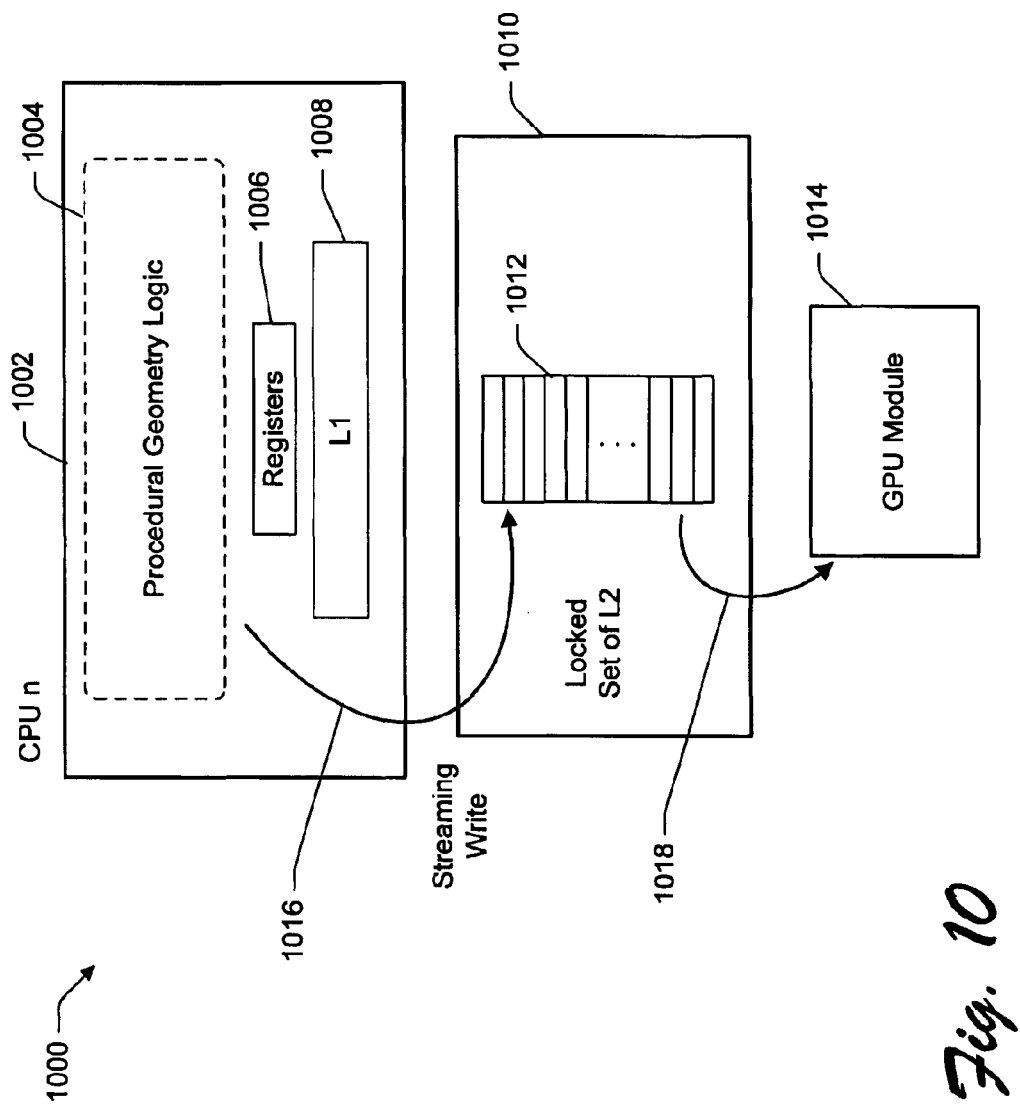
FIG. 10 illustrates an exemplary technique for writing information out of a computer processing unit into the graphics processing unit module in a streaming write mode of operation.
Figure 11:
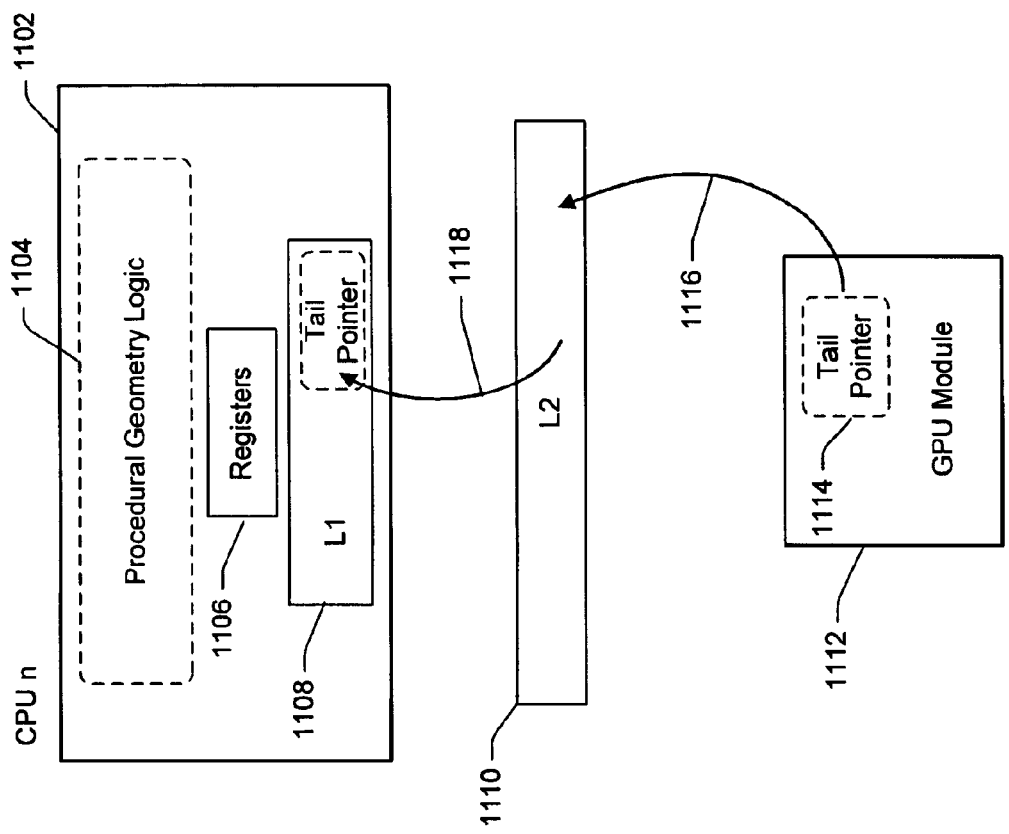
FIG. 11 illustrates an exemplary technique for writing a tail pointer from the graphics processing unit module to the computer processing unit module.

FIGS. 9–11 describe an exemplary manner of operation of the system 100 shown in FIG. 1. More specifically, there are two aspects of operations illustrated in FIGS. 9–11 associated with the geometry data streaming functionality described above. FIG. 9 describes the reading functionality associated with the streaming operation, and FIGS. 10 and 11 describe the writing functionality associated with the streaming operation. In this context, "reading" refers to the loading of information into an exemplary geometry-generating CPU. The geometry-generating CPU then proceeds to perform procedural geometry (or other processing) on the input data to provide output geometry data. The "writing" refers to the transfer of such geometry data from the geometry-generating CPU to the GPU module, and also pertains to all of the cache management issues associated 19 therewith.

The read streaming and write streaming operations are described in greater detail below, followed by a summary of the operation of the entire system 100 shown in FIG. 1.

B.1. Read Streaming

Beginning with FIG. 9 (which illustrates the read streaming operation), an exemplary CPU 902 is shown, which includes procedural geometry logic 904 (or other kind of processing logic for generating geometry data), registers 906, and an L1 cache 908. An L2 cache 910 is also illustrated in this figure. The objective of the read stream operation is to receive input information from an input source in an efficient manner. Such a source is represented generically in FIG. 9 as bus 912. The information provided by bus 912 can originate from system memory 130 (in FIG. 1), from a host CPU, or from some other source. For instance, in the case of the generation of a three dimensional scene in a gaming environment, the input information may represent the position of an object to be rendered by the three dimensional graphics processing pipeline, or other attributes of the scene.

There are different techniques that can be used for loading information into the CPU 904. In one technique represented by path 914, the L1 cache 908 is implemented as an n-way set-associative cache (e.g., a Sway or more set associative cache). In this technique, the information is received directly into a locked set of the L1 cache 908, bypassing the L2 cache 910. The information can then be transferred from the L1 cache 908 to the registers 906. In another technique represented by path 916, the information is transferred directly into the registers 906. In yet another technique presented by path 918, the information is transferred into a locked set of the L2 cache 910, and thereafter transferred to the registers 906. In yet another technique (not shown), the information can be streamed into a 2 or more way L1 cache, but with no set locking. Whatever technique is used, in preferred implementations, the CPU 902 prefetches the read information, which means that it requests this information in advance of its use (that is, it receives this data multiple cycles in advance of its use, such as approximately, 100 or more cycles in advance of its use, although a smaller number of prefetch cycles can be used as well). The prefetching facilitates the streaming operation by reducing the impact of data read stalls that may cause undesirable delays in processing. The above-described techniques may offer different respective advantages, depending on a particular processing environment. For example, the technique that involves locking a set in the L1 cache only affects the CPU associated with that L1 cache, whereas locking the shared L2 cache will affect all of the CPUs coupled to this cache.

Bypassing the L1 cache 908 or the L2 cache 910 in the manner described above does not negatively affect the operation of the CPU 902 because the CPU 902 is unlikely to reread the input information from the L1 cache 908 or the L2 cache 910. Therefore, the L1 cache 908 and the L2 cache 910 do not need to store a copy of the information read into the CPU 902. In other words, since the CPU 902 is unlikely to reread the input information, the L1 or L2 caches do not have to serve their conventional roles of providing a readily accessible copy of recently received information for later reading. Bypassing these caches is desirable because it avoids causing other data that is likely to be reused (such as data that is not associated with the streaming operation) to be cast out of the caches. That is, bypassing the caches prevents the streaming operation from thrashing the caches.

B.2. Write Streaming

FIG. 10 shows the write streaming operation 1000. This figure illustrates an exemplary CPU 1002 having procedural geometry logic 1004 (or other kind of processing logic for generating geometry data), registers 1006, and an L1 cache 1008. A locked set of the L2 cache 1010 is shown including a FIFO 1012 allocated to the CPU 1002, as well as a GPU module 1014. More specifically, the FIFO 1012 receives geometry data forwarded by the CPU 1002. The FIFO 1012 also serves as a temporary repository of geometry data that can be retrieved by the GPU module 1014.

Data paths 1016 and 1018 describe the operations performed in the write streaming operation. However, before these operations take place, the system 100 performs a preliminary step of locking the set 1010 (or potentially, more than one set) in the L2 cache. Setting up the FIFOs also involves properly setting up the cache by marking the lines in the locked set 1010 as valid and so-called "dirty." This operation also involves allocating tags and data to the cache lines in the locked set. This operation is referred to as a "create dirty" procedure and does not perform a read allocation with its requisite read access to the system memory 130.

After the L2 cache is locked and properly initialized, the write streaming operation proceeds by forwarding geometry data from the CPU 1002 directly into FIFO 1012 of the locked set 1010 of the L2 cache (e.g., by bypassing the L1 cache 1008). This can be performed by writing the geometry data to an appropriate address location associated with the storage locations in the FIFO 1012 that will receive the geometry 11 data. This operation is represented by data path 1016. Bypassing the L1 cache 1008 prevents the heavy output bandwidth of the procedural geometry logic 1004 from thrashing the L1 cache 1008. The bypassing of the L1 cache 1008 does not negatively affect the performance of the CPU 1002 because the write streaming data will not likely be reread by the CPU 1002 (and thus, there is no need to maintain a copy of this data in the L1 cache 1008). In an alternative implementation (not shown), an n-way set associative cache can be used to implement the L1 cache 1008, and one of the sets provided in such a cache can be locked to prevent the write streaming operation from thrashing the L1 cache 1008.

After the FIFO 1012 has stored a predetermined amount of geometry data, or after some other conditions regarding the transfer of information have been met (e.g., after all geometry requested by a given API call to generate geometry is complete), the system 100 "kicks off" the GPU module 1014. This prompts the GPU module 1014 to fetch the information from the FIFO 1012. More specifically, the GPU module 1014 can use a DMA protocol to retrieve information from the FIFO 1012. In the DMA protocol, the GPU module 1014 retrieves blocks of data from FIFO 1012 at an address provided to it by the system 100. However, conventional DMA typically coordinates transfer of information between a system memory and an I/O device. In the present case, in one exemplary case, it is desirable to eliminate performing these data transfers with the system memory 130. To this end, a coherency module (e.g., coherency module 150 shown in FIG. 1) in the GPU module 1014 instructs the GPU module 1014 to retrieve the data from the locked set 1010 of the L2 cache rather than the system memory 130. Once the GPU module 1014 reads the information from the FIFO 1012 in the locked set 1010 of the L2 cache (causing the information to be "cast out" of the L2 cache), the coherency module 150 maintains the entry marked as valid and marked as dirty. In this manner, the CPU 1002 maintains ownership of the cache line, rather than allowing ownership to pass to the system memory 130. In other words, this operation does not result in the reallocation of cache lines; the FIFO 1012 remains allocated to the CPU 1002 and can be refilled when the pointer wraps around to designate the top of the FIFO 1012.

Although not illustrated in FIG. 10, a CPU can also perform write streaming directly to system memory 130 by bypassing both the L1 cache 1008 and the L2 cache 1010 (which is referred to as a "non-temporal store" operation). This operation can be performed by optionally gathering the data into larger blocks and then sending these blocks of data over the bus 106 to the system memory 130. This operation might be desirable when it is anticipated that the data generated by a CPU will not be immediately read (e.g., by the GPU 1014). In this circumstance, if this data was forwarded to the L1 and L2 caches (1008, 1010), there would be a substantial likelihood that this data would be eventually cast out of the caches before it could be read. Further, in some cases, storing such data in the L1 and L2 caches (1008, 1010) can result in the thrashing of these caches. These considerations may warrant streaming the data directly into the system memory 130, bypassing the L1 and L2 caches (1008, 1010). In one example, a graphics driver (not shown) of the host CPU can use this technique to generate a GPU command list (also known as a "push buffer") and to transmit this command list to the GPU 1014. The write streaming to the system memory 130 in this case would prevent the thrashing of the caches (1008, 1010).

Finally, the above discussion emphasized the use of data streaming to move large amounts of data generated by decompression logic (e.g., procedural geometry or higher 8 order surface tessellation) from the CPU module to the GPU module. However, the techniques described above can be used to transfer any kind of data from the CPU module to the GPU module (that is, including data that is not generated by decompression logic).

B.3. Tail Pointer Considerations

With reference to FIG. 10, when GPU module 1014 receives geometry data from the FIFO 1012 of the locked set 1010 of the L2 cache, the GPU module 1014 has thereby freed up memory space for the transfer of additional geometry data to the FIFO 1012 by the CPU 1002. FIG. 11 shows a technique whereby the GPU module 1014 can notify the CPU 1002 of such freed up space.

More specifically, FIG. 11 shows an exemplary CPU 1102, which includes procedural geometry logic 1104 (or other kind of processing logic for generating geometry data), registers 1106, and an L1 cache 1108. An L2 cache 1110 is also illustrated in this figure, as well as a GPU module 1112. In addition, FIG. 11 shows that the GPU module 1112 stores a tail pointer 1114 associated with the FIFO in the locked set (not shown in FIG. 11). More specifically, the tail pointer 1114 designates a storage location in the FIFO where the GPU module 1010 has just read from.

The GPU module 1112 periodically informs the CPU 1102 of the current value of the tail pointer 1114 by transferring the tail pointer to the L2 cache 1110. This operation is indicated in FIG. 11 by path 1116. The storage of the tail pointer in the L2 cache 1110 causes the corresponding tail pointer location in the L1 cache 1108 to be marked as invalid. The invalidation of the L1 location occurs using the cache coherency functionality that keeps the L1 data coherent with modifications made to the same physical address L2 locations. A subsequent CPU 1102 load of the tail pointer location will be responded to by retrieving the most current version of the tail pointer, e.g., as stored in the L2 cache 1110. In an alternative implementation, the GPU module 1112 can forward the tail pointer directly to some other cacheable storage associated with the CPU 1102 or GPU 1112, with the lower read latency solution preferred. By marked contrast, in typical GPU configurations, the GPU module 1112 interacts with system memory, which requires a much higher latency to reload once the tail pointer location in the CPU L2 1110 is invalidated. The use of interrupts to handle this task can be even more problematic in terms of latency issues.

The CPU 1102 periodically polls the tail pointer stored in the L1 cache 1108 to determine whether there is sufficient space in the FIFO (not shown) for receiving geometry data generated by procedural geometry logic 1104. Polling of local memory associated with the CPU 1102 is much more efficient than the polling of system memory 130, since main memory polling would waste bandwidth on internal CPU busses, the CPU-GPU bus, GPU busses, and main memory. Since the polling is done on an L1 cacheable tail pointer location, all the polling bandwidth is local to the CPU 1102 and does not consume shared resources elsewhere in the system, and does not incur the latency problems associated with other polling strategies that involve system memory.

B.4. Summary of Operation of the System

Figure 12:
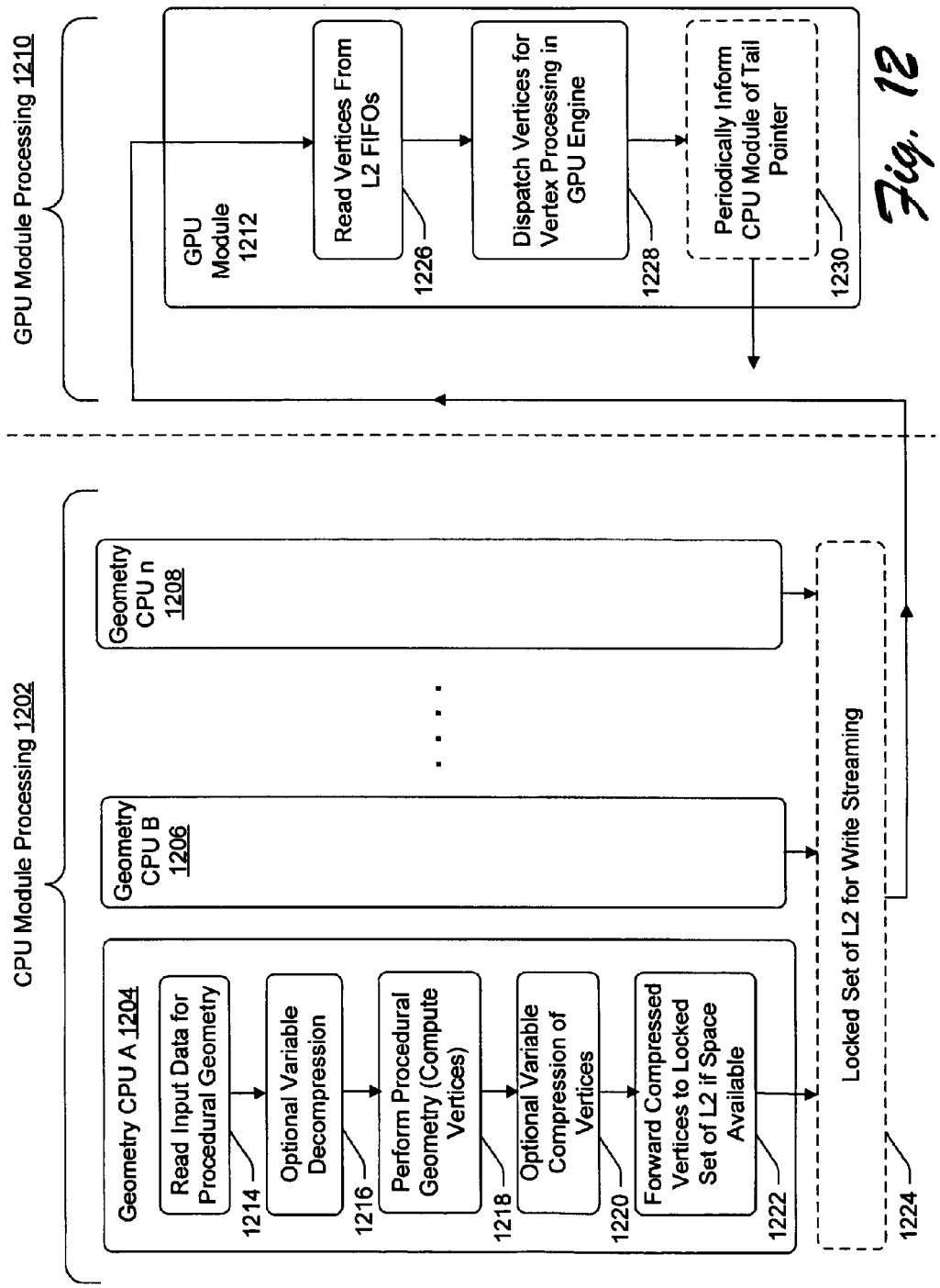
FIG. 12 shows a summary of exemplary processing operations performed in the system of FIG. 1.

FIG. 12 shows a summary of the above-described streaming operations performed by the system 100 shown in FIG. 1. The left-hand side of the figure pertains to CPU module processing 1202, that is, operations performed in the CPU module 102 shown in FIG. 1. More specifically, blocks 1204, 1206, and 1208 pertain to processing performed in individual CPUs shown in FIG. 1, such as CPU 110, CPU 112, etc. The right-hand side of the figure pertains to GPU module processing 1210, that is, operations performed in the GPU module 104 shown in FIG. 1 (and reproduced in FIG. 12 as GPU module 1212). The operations performed in the CPU module processing 1202 can occur in parallel with the operations performed in the GPU module processing 1210. Further, the operations performed in the individual CPUs (in blocks 1204, 1206, 1208) can occur in parallel with each other. (Note that, to facilitate discussion of the streaming operation, the role of any host CPU, such as host CPU 108 shown in FIG. 1, is omitted from FIG. 12.)

Exemplary operations performed in the CPUs will be described with reference to geometry-processing CPU 1204. These operations include step 1214 which entails reading information into the CPU 1204. This information may constitute a relatively meager amount of data used by the CPU 1204 to perform procedural geometry operations (or higher order surface tessellation). For instance, in the above-mentioned example of the rendering of a tree, the received information might constitute data regarding the positions of different parts of the tree, as well as the direction and velocity of any simulated wind that will move the leaves in the rendered scene. Step 1216 entails decompressing the received information (if it is received in compressed form). Step 1218 entails performing procedural geometry (or higher order surface tessellation) based on the received information. Step 1218 results in the generation of a set of output vertices. In the case of the example of the tree, the vertices constitute meshes of triangles used to render individual respective leaves. Further, the computations performed in step 1218 can include performing dot product operations using the AOS approach described in FIG. 8. Step 1220 entails compressing the output vertices. Step 1222 entails forwarding the compressed vertices to a FIFO allocated to the CPU 1204 in a locked set of the L2 cache 1224.

On the right side of FIG. 12, in step 1226, the GPU module 1212 reads vertices stored in the L2 cache 1224. In step 1228, the GPU module 1212 dispatches vertices for vertex processing in the GPU engine (e.g., engine 114 of FIG. 1). Finally, step 1230 generally indicates that the GPU module 1212 periodically forwards information regarding the tail pointer to the CPUs in the CPU module 102. The GPU module 1212 can process the vertices thus received in parallel with the tail writeback update. As described above, this tail pointer describes how far the GPU module 1212 has advanced in reading information stored in the L2 cache 1224, which, in turn, informs the CPUs of the availability of freed-up space in the L2 cache 1224 that they can fill with new vertex data.

The foregoing discussion in Section B presented merely one exemplary technique for transferring data from cache memory into the GPU module 104. Other techniques can be used. For example, in the above discussion, the coherency module 150 plays a role in coordinating the transfer of data in the streaming operation using a duplicate tag store scheme. In another strategy, the system 100 can allocate separate address ranges to the FIFOs (506–512) in the locked set 502 of the L2 cache 122, where these addresses do not map to system memory 130. In this approach, the system 100 does not need to consult a duplicate tag store to determine that information is stored in the locked set 502 of the L2 cache 122. The coherency module 130 in this approach is therefore only used to maintain coherency between the CPU module 102's caches and system memory 130 for all data besides that stored in the streaming write FIFOs (506–512).

C. Exemplary Application to a Gaming Environment

Figure 13:
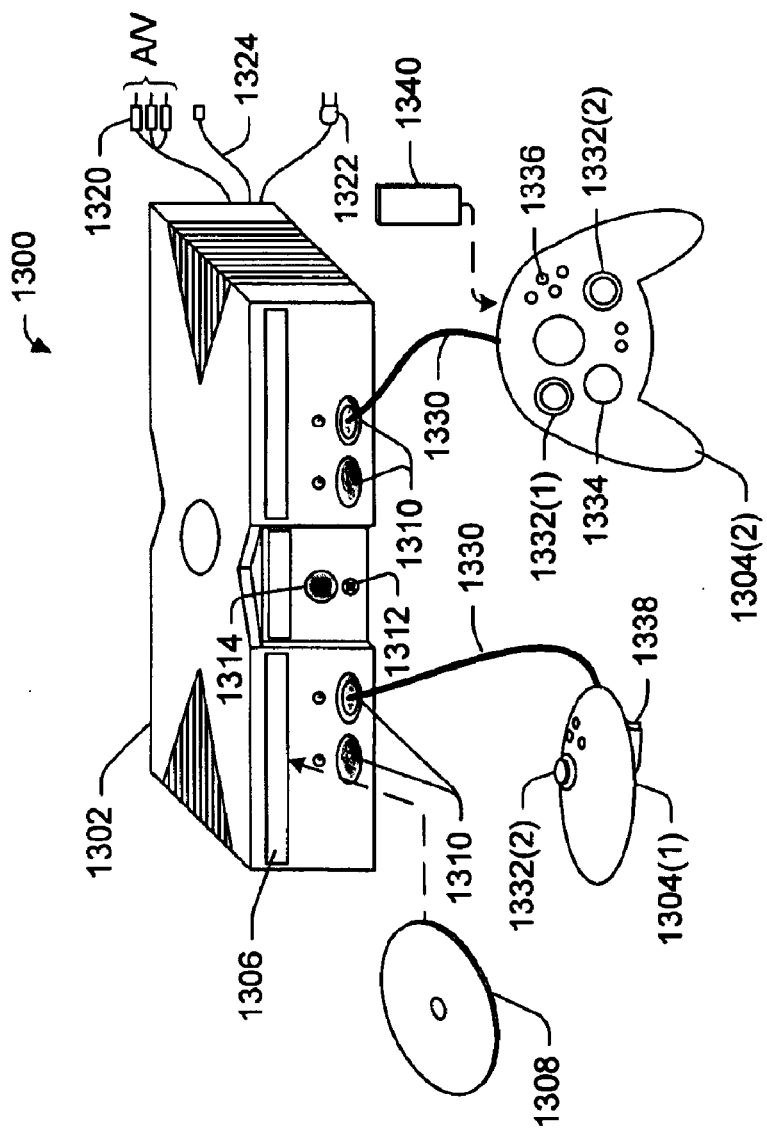
FIG. 13 shows an exemplary gaining system having a game console and one or more controllers in which the architecture and techniques described herein can be implemented.

FIG. 13 shows an exemplary gaming system 1300 that can be used to implement the above-described parallel architecture and techniques. It includes a game console 1302 and up to four controllers, as represented by controllers 1304(1) and 1304(2). The game console 1302 is equipped with an internal hard disk drive and a portable media drive 1306. The portable media drive 1306 supports various forms of portable storage media as represented by optical storage disc 1308. Examples of suitable portable storage media include DVD, CD-ROM, game discs, game cartridges, and so forth.

The game console 1302 has four slots 1310 on its front face to support up to four controllers, although the number and arrangement of slots may be modified. A power button 1312 and an eject button 1314 are also positioned on the front face of the game console 1302. The power button 1312 switches power to the game console and the eject button 1314 alternately opens and closes a tray of the portable media drive 1306 to allow insertion and extraction of the storage disc 1308.

The game console 1302 connects to a television or other display (not shown) via A/V interfacing cables 1320. A power cable 1322 provides power to the game console. The game console 1302 may further be equipped with internal or externally added network capabilities, as represented by the cable or modem connector 1324 to facilitate access to a network, such as a local area network (LAN) or the Internet.

Each controller 1304 is coupled to the game console 1302 via a wire or wireless interface. In the illustrated implementation, the controllers are USB (Universal Serial Bus) compatible and are connected to the console 1302 via serial cables 1330. The controller 1302 may be equipped with any of a wide variety of user interaction mechanisms. As illustrated in FIG. 13, each controller 1304 is equipped with two thumbsticks 1332(1) and 1332(2), a directional or D-pad 1334, surface buttons 1336, and two triggers 1338. These mechanisms are merely representative, and other known gaming mechanisms may be substituted for or added to those shown in FIG. 13.

A memory unit (MU) 1340 may be inserted into the controller 1304 to provide additional and portable storage.

Portable memory units enable users to store game parameters and transport them for play on other consoles. In the described implementation, each controller is configured to accommodate two memory units 1340, although more or less than two units may be employed in other implementations.

Although not shown, the gaming system 1300 can include a processing architecture that corresponds to system 100 shown in FIG. 1. Such a system 100 allows for the generation of scenes having a high degree of complexity, and thus, potentially, a relative high degree of realism. This may help create an immersive game environment, adding to the player's interest in the game.

D. Conclusion

Architecture and related methods for parallel execution of data-generating tasks were disclosed. In one exemplary application, the architecture and related methods provide a large amount of geometry data for use in rendering a complex and realistic scene. At the same time, the architecture and related methods provide strategies for reducing the amount of system memory data transfer operations.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system comprising:
   a system memory;
   a computer processing module, including:
      a host processing element configured to perform a task;
      a data-generating processing element configured to perform a subtask within the task, including:
         logic configured to receive input data; and
         logic configured to process the input data to produce output data, wherein an amount of output data is greater than an amount of input data, a ratio of the amount of input data to the amount of output data defining a decompression ratio,
         wherein the output data generated by the data-generating processing element is not contained in the system memory prior to it being generated by the data-generating processing element;
      a cache memory coupled to the data-generating processing element for receiving the output data;
      a computer processing module interface for outputting the output data from the cache memory;
   a communication bus;
   a data processing module, including:
      a data processing module interface coupling to the computer processing module interface via the communication bus for receiving the output data; and
      a data processing engine for receiving and processing the output data from the cache memory, wherein the data processing engine uses a tail pointer to indicate a location within the cache memory from which it has just retrieved data;
   wherein, in a write streaming mode of operation, the computer processing module is configured to allocate a portion of the cache memory for the purpose of receiving streaming write output data from the data-generating processing element,
   wherein, in the write streaming mode of operation, the system is configured to forward output data from said allocated portion of the cache memory to the data processing module rather than from the system memory, and
   wherein the data processing module is configured to forward the tail pointer to a cacheable address of the data-generating processing element, the tail pointer informing the data-generating processing element of the location within the cache memory from which the data processing module has just retrieved data.

2. A system according to claim 1, wherein the host processing element comprises a thread implemented on a computer processing unit, and the data-generating processing element comprises a thread implemented on the same computer processing unit or implemented on another computer processing unit.

3. A system according to claim 1, further comprising plural host processing elements.

4. A system according to claim 3, wherein the plurality host processing elements comprise a plurality of respective threads implemented on at least one computer processing unit.

5. A system according to claim 1, further comprising plural data-generating processing elements.

6. A system according to claim 5, wherein the plurality of data-generating processing elements comprises plural respective threads implemented on at least one computer processing unit.

7. A system according to claim 1, wherein the host processing element and the data-generating processing element each perform functions that are statically allocated.

8. A system according to claim 1, wherein the host processing element and the data-generating processing element each perform functions that are dynamically is allocated.

9. A system according to claim 1, further comprising plural data-generating processing elements, wherein each of the plural data-generating processing elements is coupled to the cache memory.

10. A system according to claim 1, wherein the data-generating processing element includes an L1 cache, and said cache memory of the computer processing module is an L2 cache.

11. A system according to claim 10, wherein, in a read streaming mode of operation, the computer processing module is configured to provide the input data by forwarding the input data to the L1 cache of the data-generating processing element, by bypassing the L2 cache.

12. A system according to claim 10, wherein, in the write streaming mode of operation, the computer processing module is configured to forward the output data to the L2 cache by bypassing the L1 cache.

13. A system according to claim 1, wherein the cache memory is an n-way set-associative cache, and wherein the portion is allocated by locking at least one set of the n-way set-associative cache.

14. A system according to claim 1, wherein the allocated portion of the cache memory forms at least one FIFO buffer that couples the data-generating processing element to the data processing module.

15. A system according to claim 14, wherein the system is configured to wrap within said at least one FIFO buffer by using a middle section of an address to index said at least one FIFO buffer, wherein an upper section and a lower section of the address are ignored by the system.

16. A system according to claim 1, wherein the data processing module is configured to process output data received from the cache memory using a modified direct memory access (DMA) protocol.

17. A system according to claim 1, wherein the computer processing module is configured to maintain a cache line state of dirty after accessing a cache line.

18. A system according to claim 1, wherein the decompression ratio is at least 1 to 10.

19. A system according to claim 1, wherein the decompression ratio is at least 1 to 100.

20. A system according to claim 1, wherein the decompression ratio is at least 1 to 1000.

21. A system according to claim 1, wherein the data-generating processing element is configured to dynamically vary the ratio of decompression during its operation in response to at least one criterion.

22. A system according to claim 21, wherein said at least one criterion is depth of scene associated with an object in a scene.

23. A system according to claim 1, wherein the logic for processing the input data further comprises logic configured to execute a dot product operation upon receipt of a dot product instruction using an array of structures computational technique.

24. A system according to claim 1, wherein the logic for processing the input data further comprises logic for compressing data from a first information content amount to a second information content amount to provide the output data, wherein the first information content amount is greater than the second information content amount.

25. A system according to claim 1, wherein the task performed by the host processing element pertains to a graphics processing task, and wherein the subtask performed by the data-generating processing element pertains to the generation of geometry data.

26. A system according to claim 25, wherein the task performed by the host processing element pertains to high level aspects of a three dimensional game application.

27. A system according to claim 25, wherein the logic for processing input data comprises procedural geometry logic configured to transform the input data into the output data, wherein the output data comprises a set of vertices.

28. A system according to claim 25, wherein the logic for processing input data comprises a higher order surface tessellation engine configured to transform information expressed in a higher order surface into output data comprising a set of vertices.

29. A system comprising:
a system memory;
a host processing element configured to perform a task; a data-generating processing element configured to perform a subtask within the task, including:
logic configured to receive input data; and
logic configured to process the input data to generate output data, wherein an amount of output data is greater than an amount of input data, a ratio of the amount of input data to the amount of output data defining a decompression ratio,
wherein the output data generated by the data-generating processing element is not contained in the system memory prior to it being generated by the data-generating processing element;
a cache memory for storing the output data generated by the data-generating processing element in an allocated portion thereof;
a communication bus;
a data processing engine configured to retrieve the output data from the cache memory via the communication bus, and to process the output data, wherein the data processing engine uses a tail pointer to indicate a location within the cache memory from which it has just retrieved data; and
a tail pointer updating mechanism configured to provide tail pointer updates to a cacheable address of the data-generating processing element via the communication bus.

30. A method for processing data in a system including a host processing element, a data-generating element, and a data processing engine, wherein the host processing element and the data-generating element are coupled to the data processing engine via a communication bus, comprising:
performing a task in a host processing element, the task requiring the execution of a subtask as a part thereof;
performing the subtask in a data-generating processing element when commanded by the host processing element, the performing of the subtask including:
receiving input data; and
processing the input data to produce output data, wherein an amount of output data is greater than an amount of input data, a ratio of the amount of input data to the amount of output data defining a decompression ratio,
wherein the output data generated by the data-generating processing element is not contained in a system memory prior to it being generated by the data-generating processing element;
buffering the output data in an allocated portion of a cache memory;
retrieving, by a data processing engine, the output data from the cache memory via the communication bus, rather than the system memory; and
processing the retrieved output data in the data processing engine, wherein the data processing engine uses a tail pointer to indicate a location within the cache memory from which it has just retrieved data; and
forwarding the tail pointer to a cacheable address of the data-generating processing element, the tail pointer informing the data-generating processing element, of the location in the cache memory from which the data processing engine has just retrieved data.

31. A method according to claim 30, wherein the host processing element comprises a thread implemented on a computer processing unit, and the data-generating processing element comprises a thread implemented on the same computer processing unit or implemented on another computer processing unit.

32. A method according to claim 30, further comprising plural host processing elements.

33. A method according to claim 32, wherein the plurality host processing elements comprise a plurality of respective threads implemented on at least one computer processing unit.

34. A method according to claim 30, further comprising plural data-generating processing elements.

35. A method according to claim 34, wherein the plurality of data-generating processing elements comprises plural respective threads implemented on at least one computer processing unit.

36. A method according to claim 30, wherein the host processing element and the data-generating processing element each perform functions that are statically allocated.

37. A method according to claim 30, wherein the host processing element and the data-generating processing element each perform functions that are dynamically allocated.

38. A method according to claim 30, further comprising plural data-generating processing elements, wherein each of the plural data-generating processing elements is coupled to the cache memory.

39. A method according to claim 30, wherein the data-generating processing element includes an L1 cache, and said above-referenced cache memory is an L2 cache.

40. A method according to claim 39, wherein, in a read streaming mode of operation, the data-generating processing element receives the input data by forwarding the input data to the L1 cache of the data-generating processing element, by bypassing the L2 cache.

41. A method according to claim 39, wherein, in a write streaming mode of operation, the data-generating unit provides the output data by forwarding the output data to the L2 cache by bypassing the L1 cache.

42. A method according to claim 30, wherein the cache memory is an n-way set-associative cache, and wherein the portion is allocated by locking at least one set of the n-way set-associative cache.

43. A method according to claim 30, wherein the allocated portion of the cache memory forms at least one FIFO buffer that couples the data-generating processing element to the data processing engine.

44. A method according to claim 43, further comprising wrapping within said at least one FIFO buffer by using a middle section of an address to index said at least one FIFO buffer, wherein an upper section and a lower section of the address are ignored by the method.

45. A method according to claim 30, wherein the data processing engine processes output data received from the cache memory using a modified direct memory access (DMA) protocol.

46. A method according to claim 30, further comprising maintaining a cache line in a state of dirty after accessing a cache line.

47. A method according to claim 30, wherein the decompression ratio is at least 1 to 10.

48. A method according to claim 30, wherein the decompression ratio is at least 1 to 100.

49. A method according to claim 30, wherein the decompression ratio is at least 1 to 1000.

50. A method according to claim 30, wherein the performing of the subtask includes dynamically varying the ratio of decompression during operation of the data-generating processing element in response to at least one criterion.

51. A method according to claim 50, wherein said at least one criterion is depth of scene associated with an object in a scene.

52. A method according to claim 30, wherein the performing of the subtask involves executing a dot product operation upon receipt of a dot product instruction using an array of structures computational technique.

53. A method according to claim 30, wherein the performing of the subtask involves compressing data from a first information content amount to a second information content amount to provide the output data, wherein the first information content amount is greater than the second information content amount.

54. A method according to claim 30, wherein the task performed by the host processing element pertains to a graphics processing task, and wherein the subtask performed by the data-generating processing element pertains to the generation of geometry data.

55. A method according to claim 54, wherein the task performed by the host processing element pertains to high level aspects of a three dimensional game application.

56. A method according to claim 54, wherein the processing of input data comprises performing procedural geometry to transform the input data into the output data, wherein the output data comprises a set of vertices.

57. A method according to claim 54, wherein the processing of input data comprises performing higher order surface tessellation to transform information expressed in a higher order surface into output data comprising a set of vertices.

\* \* \* \* \*